United States Patent
Zhang et al.

(10) Patent No.: US 12,543,914 B2
(45) Date of Patent: Feb. 10, 2026

(54) WATER INTAKE STRUCTURE OF SPRAY ARM ASSEMBLY, SPRAY ARM ASSEMBLY, AND DISHWASHER

(71) Applicants: FOSHAN SHUNDE MIDEA WASHING APPLIANCES MANUFACTURING CO., LTD., Guangdong (CN); MIDEA GROUP CO., LTD., Guangdong (CN)

(72) Inventors: Liuguang Zhang, Guangdong (CN); Hyoungjun Kim, Guangdong (CN)

(73) Assignees: FOSHAN SHUNDE MIDEA WASHING APPLIANCES MANUFACTURING CO., LTD., Guangdong (CN); MIDEA GROUP CO., LTD., Guangdong (CN)

( * ) Notice: Subject to any disclaimer, the term of this patent is extended or adjusted under 35 U.S.C. 154(b) by 204 days.

(21) Appl. No.: 18/229,351

(22) Filed: Aug. 2, 2023

(65) Prior Publication Data

US 2023/0380654 A1   Nov. 30, 2023

Related U.S. Application Data

(63) Continuation of application No. PCT/CN2021/103702, filed on Jun. 30, 2021.

(30) Foreign Application Priority Data

Feb. 8, 2021 (CN) .......................... 202110172306.5
Feb. 8, 2021 (CN) .......................... 202120372983.7

(51) Int. Cl.
*A47L 15/20* (2006.01)
*A47L 15/22* (2006.01)
*A47L 15/42* (2006.01)

(52) U.S. Cl.
CPC ........... *A47L 15/4217* (2013.01); *A47L 15/20* (2013.01); *A47L 15/22* (2013.01)

(58) Field of Classification Search
None
See application file for complete search history.

(56) References Cited

U.S. PATENT DOCUMENTS

2020/0245840 A1   8/2020   Haegermarck et al.

FOREIGN PATENT DOCUMENTS

| CN | 109793478 A | 5/2019 |
|----|-------------|--------|
| CN | 209236086 U | 8/2019 |

(Continued)

OTHER PUBLICATIONS

International Search Report dated Nov. 12, 2021 issued in PCT/CN2021/103702.

(Continued)

*Primary Examiner* — Levon J Shahinian
(74) *Attorney, Agent, or Firm* — Scully, Scott, Murphy & Presser, P.C.

(57) ABSTRACT

A water intake structure, a spray arm assembly and a dishwasher are provided. The water intake structure has a water dispensing member, a water flowing pipe, a housing, a support, and a snap-fit member. The water dispensing member has a water intake passage and a water outlet. The water flowing pipe has a water flowing passage in communication with the water outlet. The water flowing pipe is rotatable relative to the water dispensing member. The housing has a mounting opening and an engagement recess. The water flowing pipe passes through the mounting opening to engage the water dispensing member. The support is engaged into the engagement recess. The water flowing pipe rotatably passes through an interior of the support. The snap-fit member is in snap-fit with the water flowing pipe (Continued)

and is configured to limit positions of the water flowing pipe and the support.

20 Claims, 13 Drawing Sheets

(56) References Cited

FOREIGN PATENT DOCUMENTS

| | | |
|---|---|---|
| CN | 110419999 A | 11/2019 |
| CN | 212394851 U | 1/2021 |
| CN | 212394862 U | 1/2021 |
| CN | 212418376 U | 1/2021 |
| CN | 215227356 U | 12/2021 |
| EP | 3488756 A1 | 5/2019 |
| KR | 20180004517 A | 1/2018 |

OTHER PUBLICATIONS

Written Opinion dated Nov. 12, 2021 received in International Application No. PCT/CN2021/103702.
First Office Action dated Aug. 7, 2024 received in Chinese Patent Application No. 202110172306.5.

WATER INTAKE STRUCTURE OF SPRAY ARM ASSEMBLY, SPRAY ARM ASSEMBLY, AND DISHWASHER

CROSS-REFERENCE TO RELATED APPLICATIONS

The present application a continuation application of PCT International Application No. PCT/CN2021/103702, filed on Jun. 30, 2021, which claims priorities to Chinese Patent Application Nos. 202110172306.5 and No. 202120372983.7, both filed on Feb. 8, 2021, each of which is incorporated herein by reference in its entirety for all purposes. No new matter has been introduced.

FIELD

The present disclosure relates to the technical field of appliance manufacturing, and more particularly, to a water intake structure of a spray arm assembly, a spray arm assembly having the water intake structure of the spray arm assembly, and a dishwasher including the spray arm assembly.

BACKGROUND

In the related art, a rotatable strip-shaped spray arm is employed by a dishwasher for cleaning, and has a rotation axis perpendicular to a length direction of the spray arm. Accordingly, it is required to provide a sufficiently large mounting space to mount the spray arm, to ensure that the strip-shaped spray arm can rotate normally. Therefore, the issue to be researched by the technicians is how to reduce the rotation space required by the spray arm while fixing and supporting the spray arm.

SUMMARY

The present disclosure aims to solve at least one of the technical problems in the related art. To this end, the present disclosure provides a water intake structure of a spray arm assembly. The water intake structure of the spray arm assembly can supply water to a spray pipe through a drive member and drive the spray pipe to rotate, and has the advantages of providing a compact and reliable structure and so on.

The present disclosure further provides a spray arm assembly having the water intake structure of the spray arm assembly.

The present disclosure further provides a dishwasher having the spray arm assembly.

According to one embodiment of the present disclosure, a water intake structure of a spray arm assembly is provided. The water intake structure of the spray arm assembly includes: a water dispensing member having a water intake passage and a water outlet in communication with the water intake passage; a water flowing pipe having a water flowing passage in communication with the water outlet, the water flowing pipe being rotatable relative to the water dispensing member; a housing having a mounting opening and an engagement recess, the water flowing pipe passing through the mounting opening to engage with the water dispensing member; a support engaged into the engagement recess, the water flowing pipe rotatably passing through an interior of the support; and a snap-fit member in snap-fit with the water flowing pipe, the snap-fit member being configured to limit positions of the water flowing pipe and the support.

According to an embodiment of the present disclosure, the water intake structure of the spray arm assembly can supply water to the spray pipe through the drive member and drive the spray pipe to rotate, and has the advantages of providing a compact and reliable structure and so on.

In addition, the water intake structure of the spray arm assembly according to the above embodiment of the present disclosure may further have the following additional technical features.

According to some embodiments of the present disclosure, the snap-fit member is configured to limit the positions of the water flowing pipe and the support in an axial direction of the water flowing pipe.

According to some embodiments of the present disclosure, a snap-fit groove is formed at an outer peripheral surface of the water flowing pipe. The snap-fit member is sleeved over an outer peripheral wall of the water flowing pipe. The snap-fit member is provided with a snap-fit protrusion, and the snap-fit protrusion is configured to be engaged into the snap-fit groove to restrict movement of the water flowing pipe away from the water dispensing member.

According to some embodiments of the present disclosure, the snap-fit member is in contact fit with an end surface of the support facing towards the water dispensing member to restrict disengagement of the support from the engagement recess.

According to some embodiments of the present disclosure, the water dispensing member has a first engagement surface. The water outlet is formed at the first engagement surface, and an end of the water flowing pipe in an axial direction of the water flowing pipe is in contact fit with the first engagement surface.

According to some embodiments of the present disclosure, the first engagement surface is provided with an engagement sleeve that extends towards the water flowing pipe, and a first seal is provided between the water flowing pipe and an inner peripheral wall of the engagement sleeve.

According to some embodiments of the present disclosure, the snap-fit member is an annular snapping plate. The annular snapping plate has an inner end formed as the snap-fit protrusion and an outer end configured to be in contact fit with the housing. The engagement recess is opened towards the water dispensing member.

According to some embodiments of the present disclosure, the water intake structure of the spray arm assembly further includes a fixing cover fixedly connected to the water dispensing member and the housing, respectively. The fixing cover has a position-limiting hole, and the water flowing pipe is disposed and extends within the position-limiting hole.

According to some embodiments of the present disclosure, a mounting cavity is defined by the fixing cover, the housing, and the water flowing pipe, and the snap-fit member is disposed in the mounting cavity.

According to some embodiments of the present disclosure, the mounting cavity is provided with a second seal sandwiched between the water flowing pipe and the fixing cover. The fixing cover has an accommodation groove, and a third seal is disposed in the accommodation groove and sandwiched between the fixing cover and the water dispensing member.

According to some embodiments of the present disclosure, the snap-fit member is a pull ring, and a position-limiting boss is disposed on the pull ring. A position-limiting engagement boss is provided on the outer peripheral surface of the water flowing pipe and engaged with the position-limiting boss, and the position-limiting boss and the engagement protrusion are spaced apart from each other in an axial direction of the pull ring.

According to some embodiments of the present disclosure, a rotation axis of the water flowing pipe extends in an axial direction of the water flowing pipe, and the water intake structure further includes a drive member configured to drive the water flowing pipe to rotate.

According to some embodiments of the present disclosure, the drive member is a gear member. The water flowing pipe penetrates a middle portion of the drive member, and the water flowing pipe and the drive member are integrally formed. The water flowing pipe includes a first pipe section located on a side of the drive member and engaged with the water dispensing member and a second pipe section located on another side of the drive member.

According to some embodiments of the present disclosure, the support is a ball bearing.

According to one embodiment of the present disclosure, a spray arm assembly for a household appliance is provided. The spray arm assembly for the household appliance includes: the water intake structure of the spray arm assembly according to the first aspect of the embodiments of the present disclosure; and a spray pipe fixedly connected to the water flowing pipe. The spray pipe has a water flowing cavity in communication with the water flowing passage, and a rotation axis of the spray pipe is parallel to an axis of the spray pipe.

With the spray arm assembly for the household appliance according to an embodiment of the present disclosure, the water intake structure of the spray arm assembly according to the above embodiments of the present disclosure can supply water to the spray pipe through the water flowing pipe and drive the spray pipe to rotate, and has the advantages of providing a compact and reliable structure and so on.

According to one embodiment of the present disclosure, a dishwasher is provided. The dishwasher includes the spray arm assembly for the household appliance according to the above embodiments of the present disclosure.

The dishwasher according to an embodiment of the present disclosure utilizes the spray arm assembly for the household appliance according to the embodiment of the second aspect of the present disclosure to enable the water intake structure to supply water to the spray pipe through the water flowing pipe and drive the spray pipe to rotate, and has the advantages of providing a compact and reliable structure and so on.

Additional aspects and advantages of the present disclosure will be provided at least in part in the following description, or will become apparent at least in part from the following description, or can be learned from practicing of the present disclosure.

BRIEF DESCRIPTION OF THE DRAWINGS

The above and/or additional aspects and advantages of the present disclosure will become more apparent and easily understood from the following description of embodiments in conjunction with the accompanying drawings.

Figure 1:
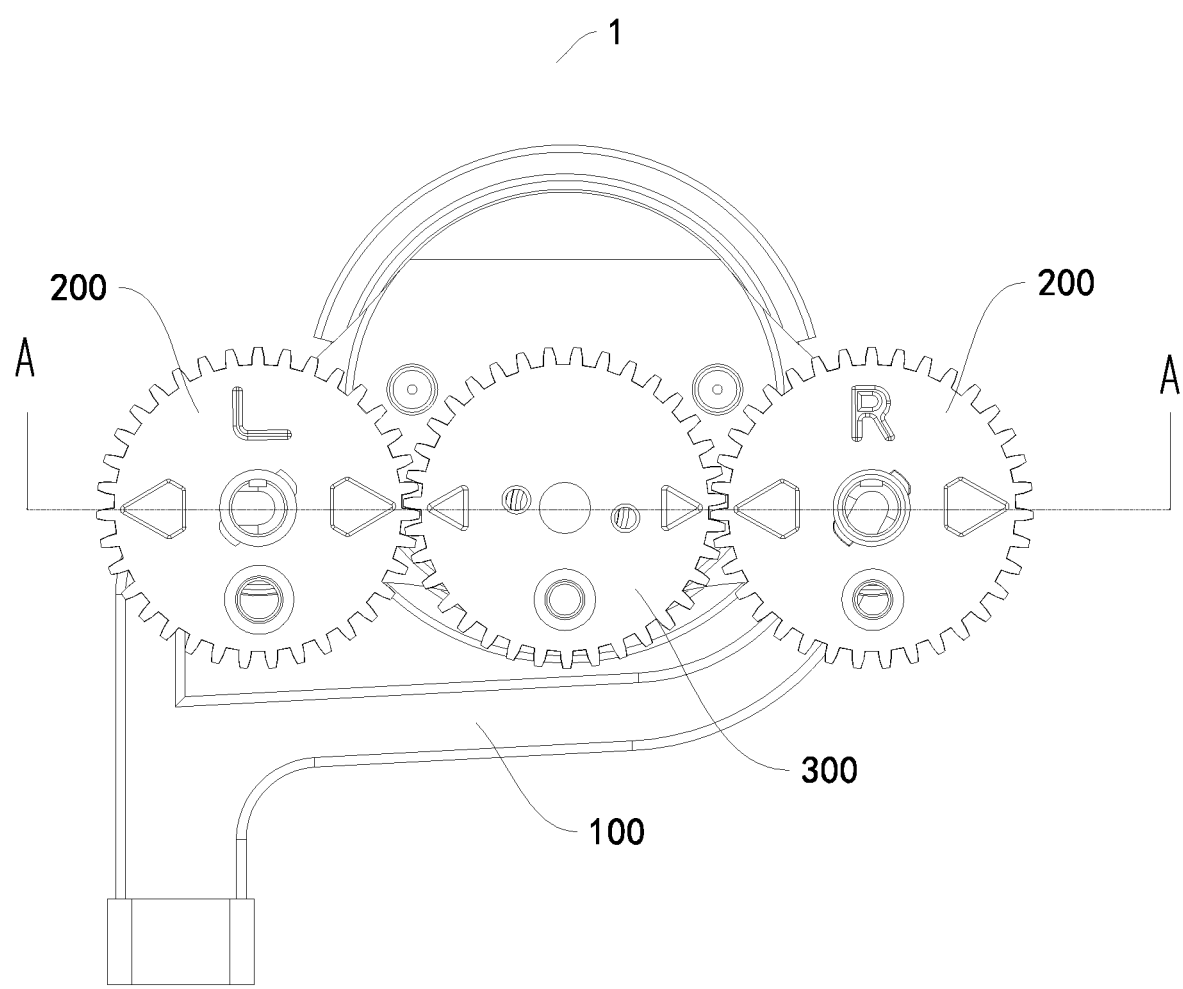
FIG. 1 is a schematic structural view of a water intake structure of a spray arm assembly according to some embodiments of the present disclosure.

REFERENCE SIGNS 1 water intake structure, 100 water dispensing member, 101 water intake passage, 102 water outlet, 110 first engagement surface, 120 engagement sleeve, 130 first seal, 140 first water-intake pipe section, 150 second water-intake pipe section,
200 gear component, 201 water flowing passage, 202 snap-fit groove, 210 drive member, 220 water flowing pipe, 221 position-limiting engagement boss,
300 transmission component,
400 housing, 401 mounting opening, 402 engagement recess,
500 snap-fit member, 510 snap-fit protrusion,
600 support,
700 fixing cover, 710 position-limiting hole, 720 mounting cavity, 730 second seal, 740 accommodation groove, 750 third seal,
2 spray pipe, 21 water flowing cavity, 22 fixing ring, 23 fixing buckle, 24 sealing ring,
3 inner tank assembly, 31 first fixing member, 32 second fixing member, 33 back plate, 34 male threaded cover,

DETAILED DESCRIPTION

Embodiments of the present disclosure are described below in detail, examples of the embodiments are shown in the accompanying drawings, and the same or similar reference signs indicate the same or similar components or components having the same or similar functions throughout the description. The embodiments described below with reference to the accompanying drawings are exemplary and merely intended to explain the present disclosure, rather than being construed as limitation to the present disclosure.

According to an embodiment of the present disclosure, a water intake structure 1 of a spray arm assembly is described below with reference to the accompanying drawings.

As illustrated in FIG. 1 to FIG. 15, the water intake structure 1 of the spray arm assembly according to an embodiment of the present disclosure may include a water dispensing member 100, a water flowing pipe 220, a housing 400, a snap-fit member 500, and a support 600.

For example, in some embodiments, the spray arm assembly of the present disclosure may include a spray pipe 2 and the water intake structure 1 that can be applied in a dishwasher. Further, the spray pipe 2 and the water intake structure 1 may be mounted in a washing cavity of the dishwasher, and the water intake structure 1 supplies the spray pipe 2 with water. As a result, the washing liquid sprayed from the spray pipe 2 can be used to spray and wash dishes to be washed in the washing cavity.

In other embodiments, the water intake structure 1 of the spray arm assembly may be applied in electrical equipment such as steam sterilizers and clothing treatment devices. The water intake structure 1 supplies the spray pipe 2 with water or gas to perform spray sterilization or spray washing by the spray pipe 2.

In the following embodiments of the present disclosure, as an example, the water intake structure 1 is applied in the dishwasher as an example for description.

For example, in some examples, the spray arm assembly may include a water dispensing member 100, a water flowing pipe 220, and a spray pipe 2. The water dispensing member 100 is fixedly disposed in the dishwasher, and may be in communication with the spray pipe 2 through the water flowing pipe 220 to supply the spray pipe 2 with water. The water dispensing member 100 has an end connected to an external water source and another end having a water dispensing connector. The water dispensing connector is configured to be in communication with the water flowing pipe 220 to supply the water flowing pipe 220 with water through the water dispensing member 100. The water flowing pipe 220 is rotatable relative to the water dispensing member 100, i.e., the water flowing pipe 220 is rotatably disposed in the dishwasher. In this way, the water flowing pipe 220 is in communication with the spray pipe 2 and can drive the spray pipe 2 to rotate. A rotation axis of the spray pipe 2 extends along a length direction thereof, i.e., the rotation axis of the spray pipe 2 extends along an axial direction thereof. Therefore, the spray pipe 2 rotates with the water flowing pipe 220 and is in fluid communication with the water flowing pipe 220. A pipe wall of the spray pipe 2 is formed with a plurality of spray apertures configured to spray water flow. In this way, the inflow of water flows into the spray pipe 2 after flowing through the water dispensing member 100 and the water flowing pipe 220, to rinse the dishes to be washed in the washing cavity. Meanwhile, the spray pipe 2 is driven by the water flowing pipe 220 to rotate, to increase a spraying range of the spray pipe 2, improve stability and reliability of the rotation of the spray pipe 2, ensure that the spray pipe 2 has a proper spraying angle, and improve a spraying and washing effect of the spray arm assembly.

In other embodiments, the water flowing pipe 220 and the spray pipe 2 may be integrally formed, i.e., the water flowing pipe 220 is formed as a part of the spray pipe 2, which enables the spray pipe 2 to be in direct communication with the water dispensing member 100. In the present disclosure, the water dispensing member 100 of the water intake structure 1 is fixedly disposed in the dishwasher, and has a water intake passage 101 and a water inlet and a water outlet 102 that are in communication with the water intake passage 101. The water inlet is configured to be connected to a tap of an external water source. The water flowing pipe 220 has a water flowing passage 201 in communication with the water outlet 102, and is rotatable relative to the water dispensing member 100. An end of the water flowing passage 201 is in communication with the water outlet 102, and another end of the water flowing passage 201 is connected to the spray pipe 2. The housing 400 has a mounting opening 401 and an engagement recess 402. The water flowing pipe 220 passes through the mounting opening 401 to be engaged with the water dispensing member 100. The support 600 is configured to be engaged into the engagement recess 402, and the water flowing pipe 220 rotatably passes through the interior of the support 600. In other words, the support 600 may be sleeved over an outer peripheral wall of the water flowing pipe 220, enabling the water flowing pipe 220 to rotate relative to the support 600. The snap-fit member 500 is in snap-fit with the water flowing pipe 220, and is configured to limit positions of the water flowing pipe 220 and the support 600.

In the water intake structure 1 of the spray arm assembly according to an embodiment of the present disclosure, a waterflow path is formed among the water dispensing member 100, the water flowing pipe 220, and the spray pipe 2. In this way, functionality of the water flowing pipe 220 can be increased. In this way, the spray pipe 2 can rotate under the driving of the water flowing pipe 220, it is ensured that the spray pipe 2 can rotate stably and reliably, thereby facilitating accurate control of the spraying angle of the spray pipe 2 to enable the spray pipe 2 to have the suitable spraying angle, improving the spraying and washing effect of the spray arm assembly, enlarging the spraying range of the spray pipe 2, and improving the washing effect of the dishwasher. Moreover, a fluid communication passage is formed among the water dispensing member 100, the water flowing pipe 220, and the spray pipe 2. In this way, when the water is required to be supplied to the spray pipe 2, the inflowing water is introduced into the spray pipe 2 through the water dispensing member 100 and the water flowing pipe 220, which facilitates smooth water inflowing of the spray pipe 2.

Therefore, the water intake structure 1 combines the water inflowing function of the spray pipe 2 with the driving function, which prevents the water intake structure 1 from interfering with the spray pipe 2 during its rotation, and ensure that this type of the spray pipe 2 can be supplied with water and rotate normally. Moreover, an internal structure of the dishwasher is more reasonable and compact to improve a space utilization rate inside the dishwasher, thereby facilitating control of a volume of the dishwasher and reducing a space occupied by the dishwasher.

Moreover, the water flowing pipe 220 can be mounted and positioned through the housing 400 and the water dispensing member 100, to ensure reliability and stability of assembling the water flowing pipe 220. The snap-fit member 500 is provided to limit both positions of the water flowing pipe 220 and the support 600. In other words, the support 600 and the water flowing pipe 220 can be limited by arranging one snap-fit member 500. In this way, the number of components of the water intake structure 1 can be reduced, and it is not necessary to provide a position-limiting structural member for each of the support 600 and the water flowing pipe 220. Accordingly, the design and manufacture of the water intake structure 1 is simpler, and the space occupied by the water intake structure 1 is reduced to make the water intake structure 1 more compact. Furthermore, a water inflowing resistance can be reduced to increase a water inflowing pressure of the water intake structure 1, and the cost of the water intake structure 1 can be reduced. Therefore, the water intake structure 1 of the spray arm assembly according to an embodiment of the present disclosure can supply water to the spray pipe 2 through the water flowing pipe 220 and drive the spray pipe 2 to rotate, and has the advantages of providing a compact and reliable structure and so on.

The water intake structure 1 of the spray arm assembly according to some exemplary embodiments of the present disclosure is described below with reference to the accompanying drawings.

In some exemplary embodiments of the present disclosure, as illustrated in FIG. 1 to FIG. 15, the water intake structure 1 of the spray arm assembly according to an embodiment of the present disclosure includes the water dispensing member 100, the water flowing pipe 220, the housing 400, the snap-fit member 500, and the support 600.

In some embodiments, the support 600 may be a bearing. For example, the support 600 may be a ball bearing, which is a type of rolling bearing. The rolling bearing may include balls, an inner ring, an outer ring, and a retainer. The balls each may be a spherical alloy steel ball, and the inner ring and the outer ring may be both a steel ring. The spherical alloy steel balls are mounted between the inner steel ring and the outer steel ring to reduce a friction force during the power transmission and improve an efficiency of mechanical power transmission by rolling. In other words, the support may be the ball bearing, and the relative rotation of the water flowing pipe 220 and the housing 400 is achieved through the rolling of the balls.

In other embodiments, the bearing 600 may be replaced by a plastic annular structure.

Figure 8:
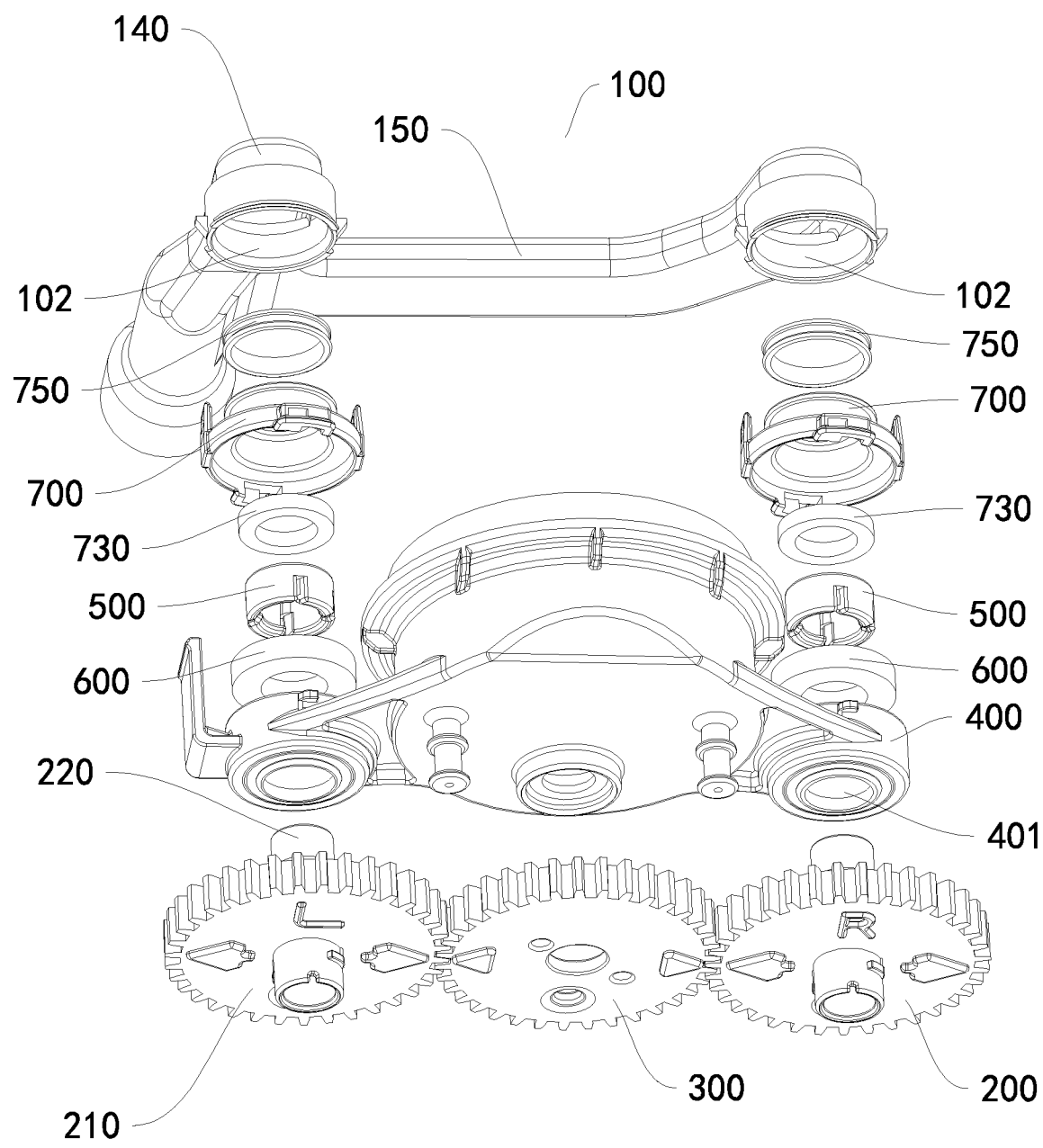
FIG. 8 is an exploded view of a water intake structure of a spray arm assembly according to other embodiments of the present disclosure.
Figure 9:
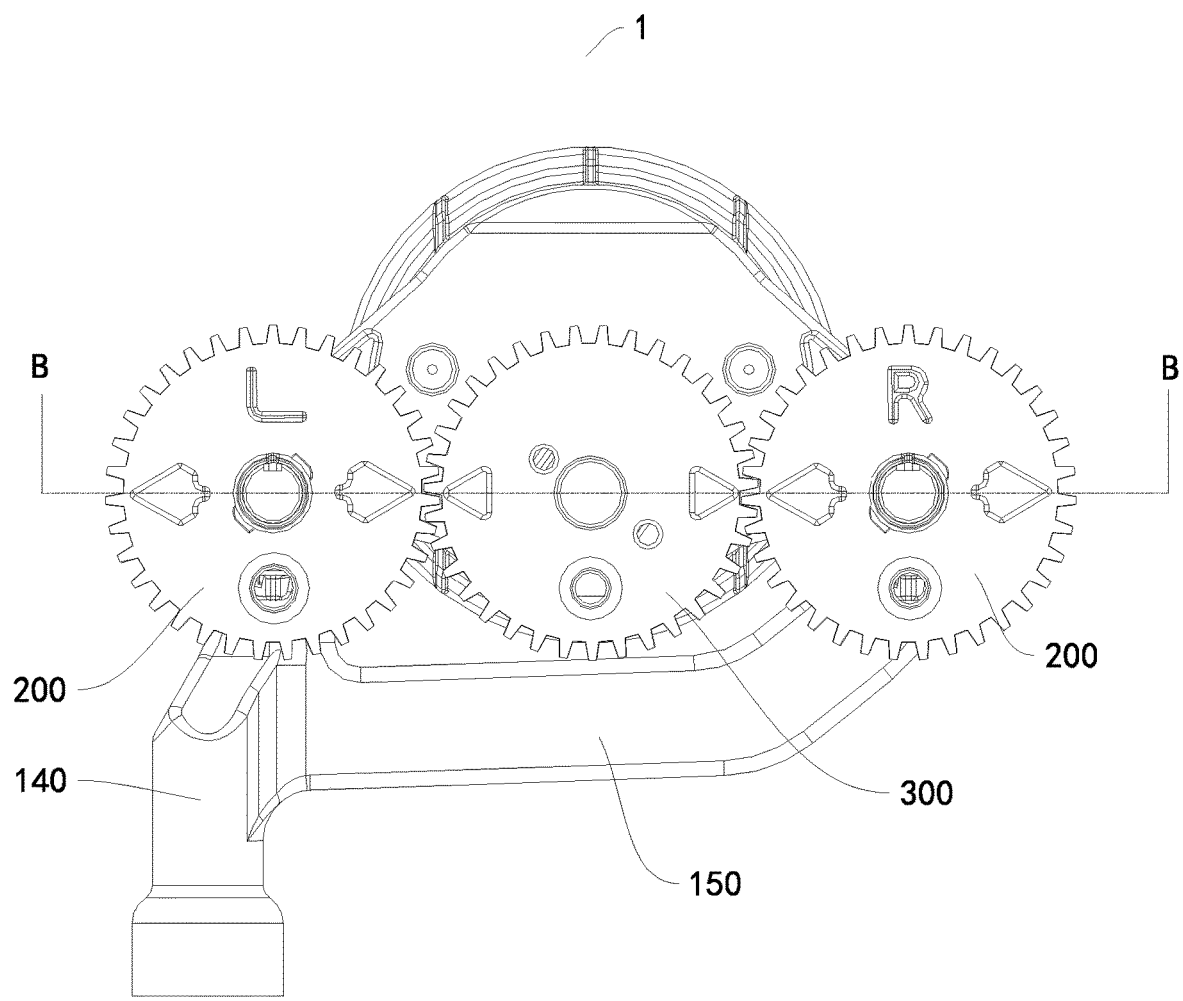
FIG. 9 is a schematic structural view of a water intake structure of a spray arm assembly according to other embodiments of the present disclosure.
Figure 10:
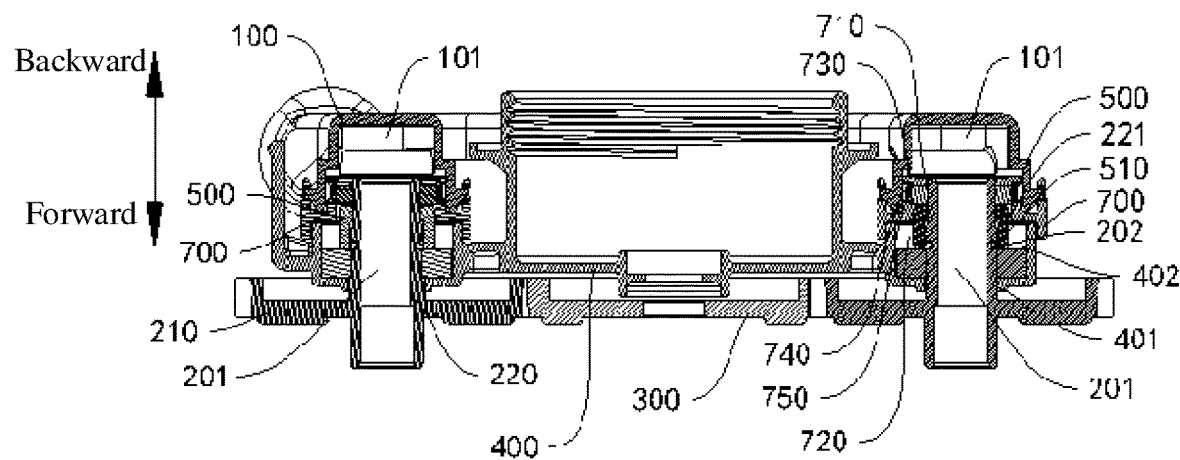
FIG. 10 is a sectional view along B-B in FIG. 9.
Figure 11:
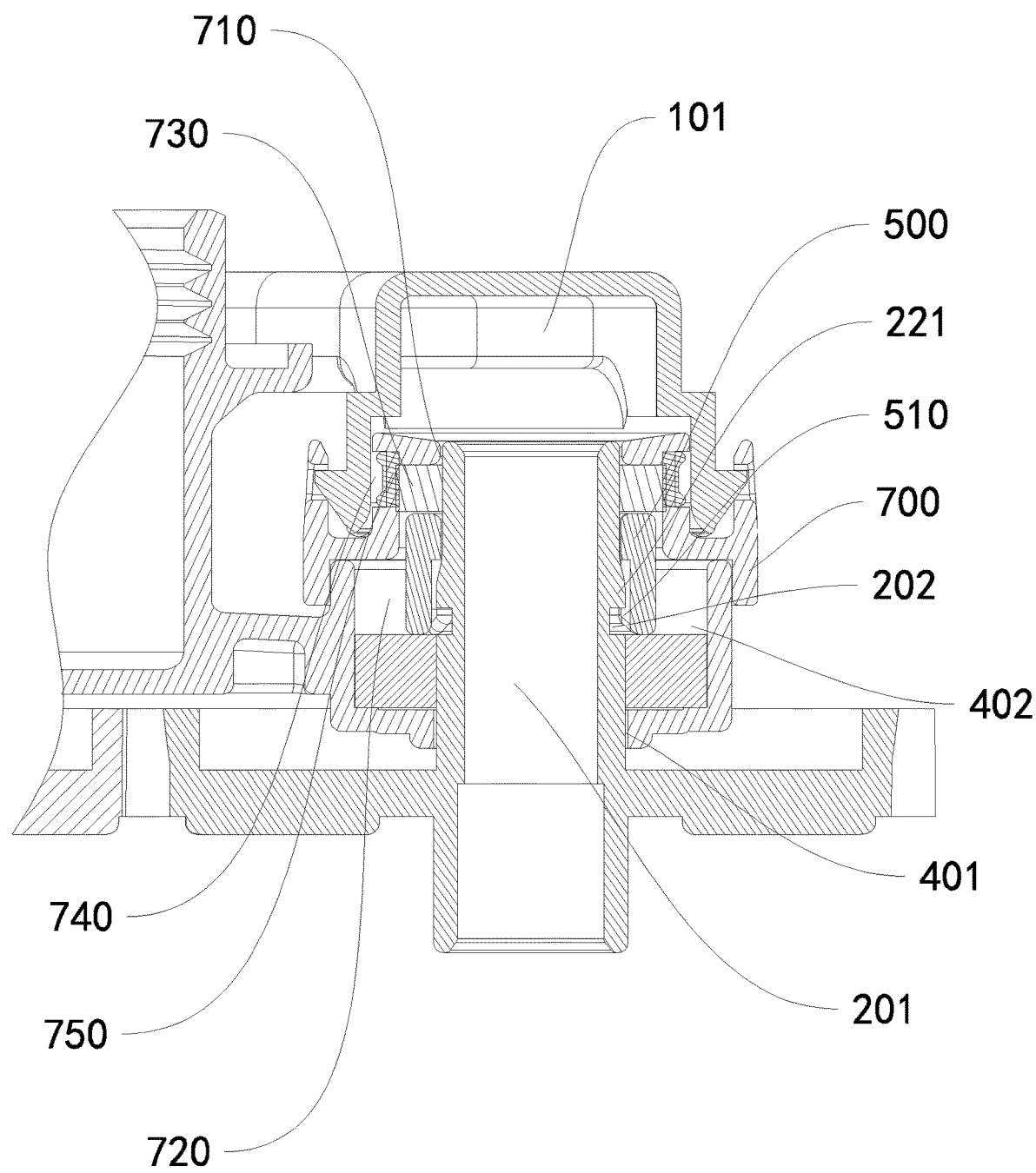
FIG. 11 is an enlarged view of a portion in FIG. 9.
Figure 12:
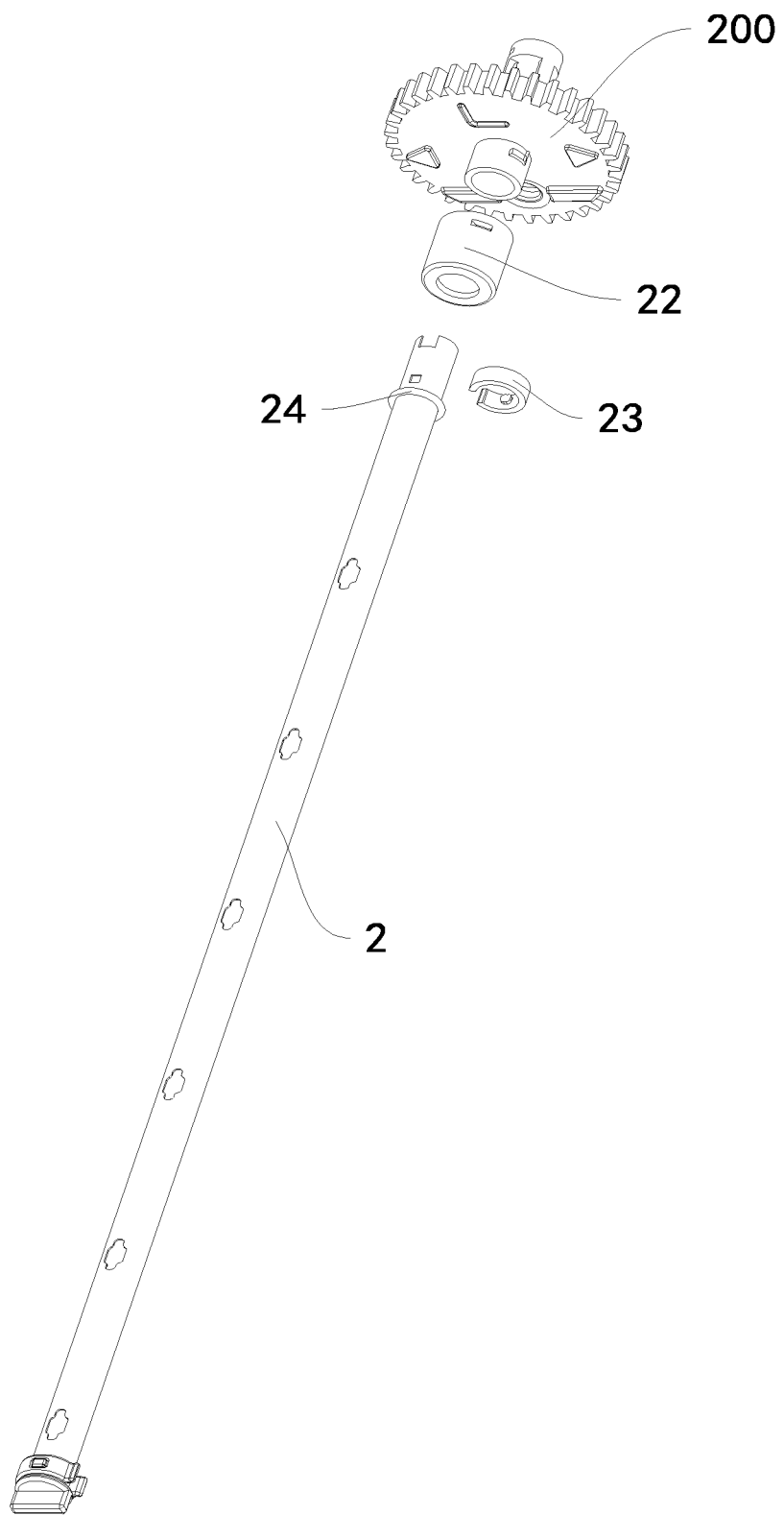
FIG. 12 is a partially exploded view of a spray arm assembly according to an embodiment of the present disclosure.
Figure 13:
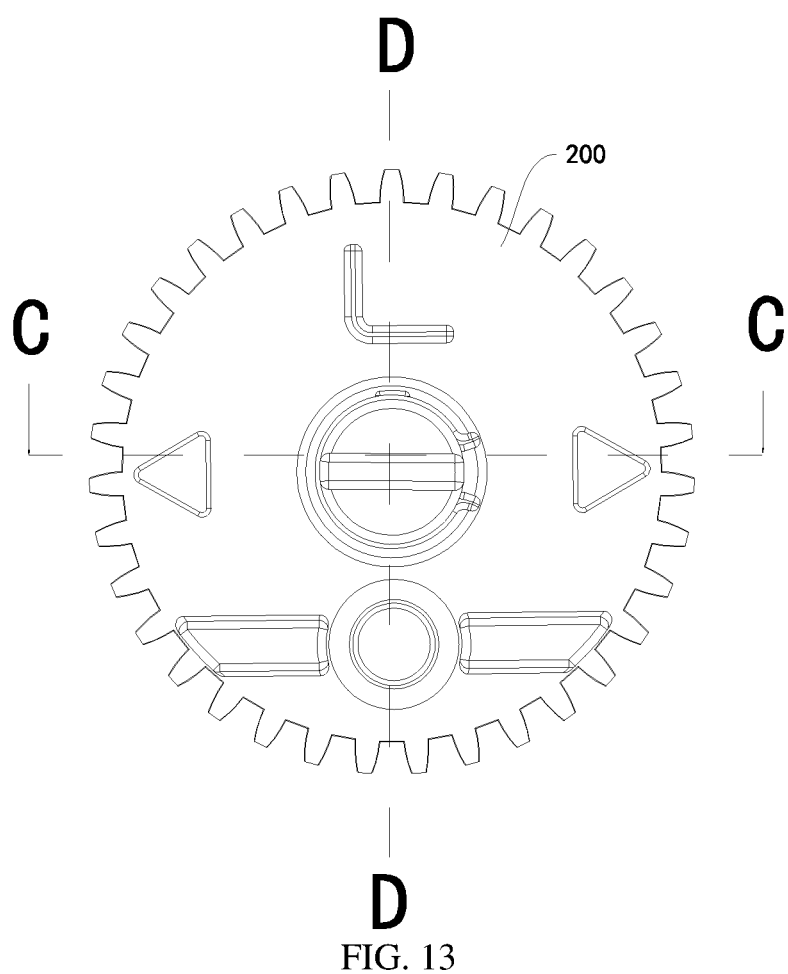
FIG. 13 is a schematic structural view of a part of a spray arm assembly according to an embodiment of the present disclosure.
Figure 14:
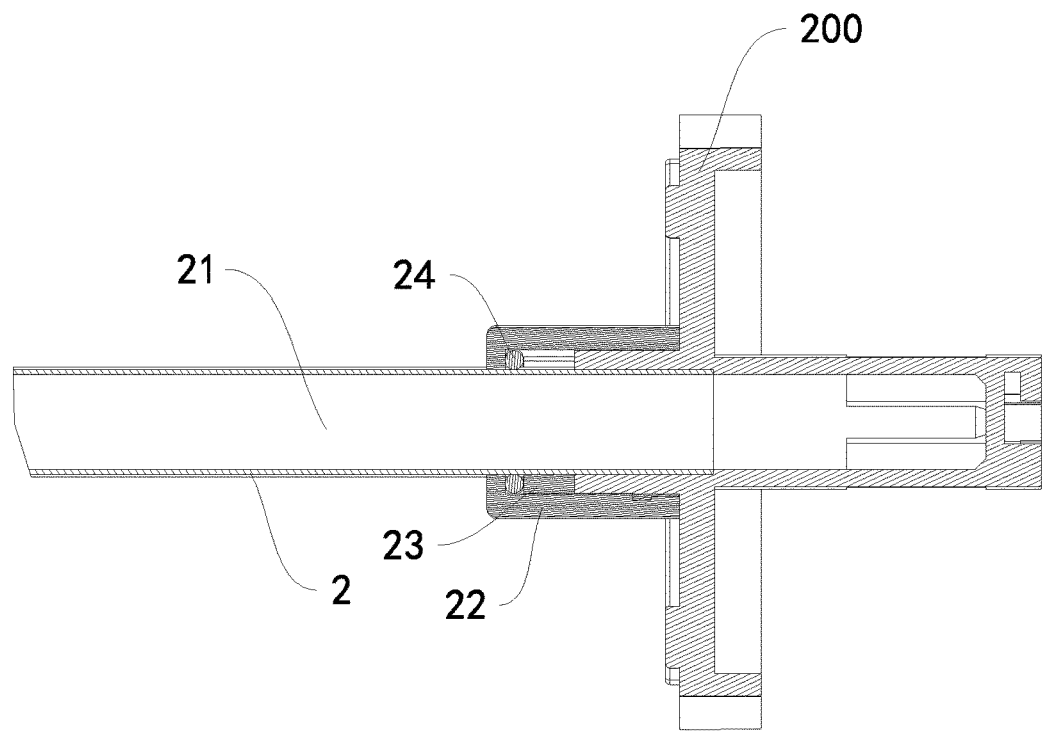
FIG. 14 is a sectional view along C-C in FIG. 13.
Figure 15:
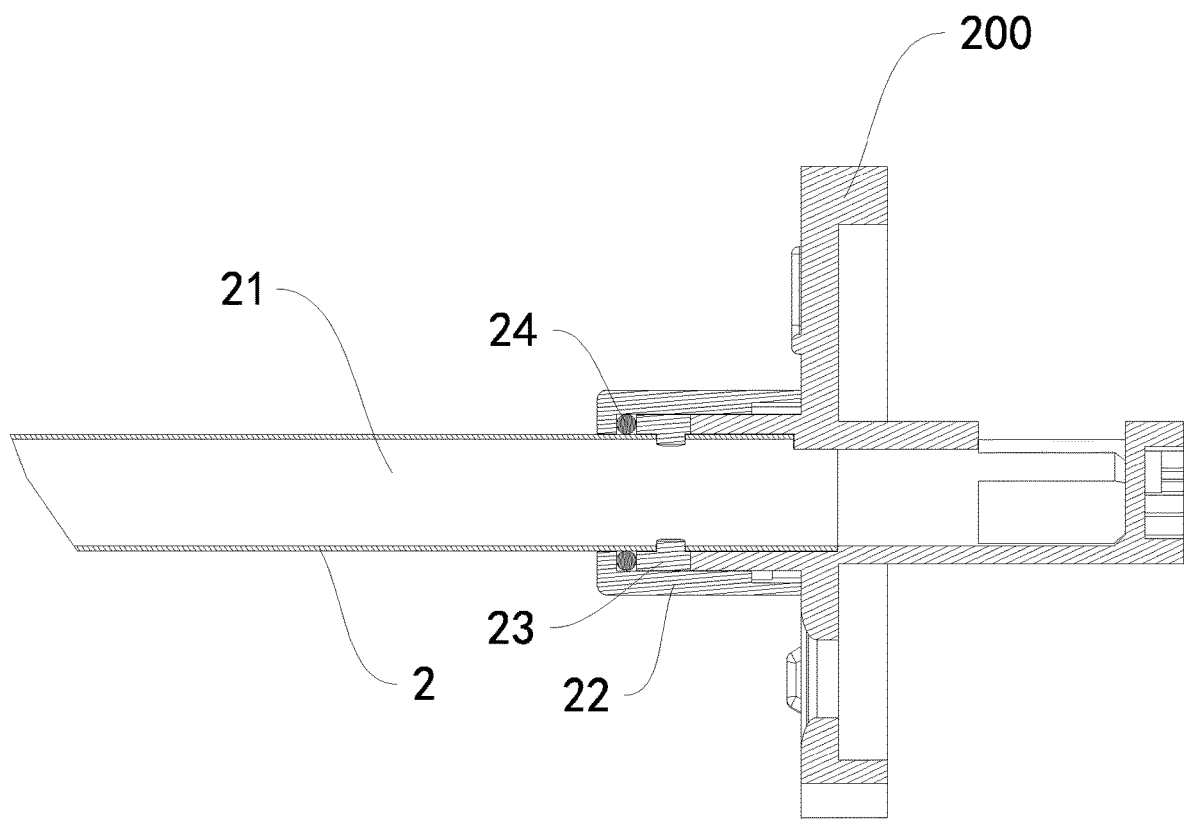
FIG. 15 is a sectional view along D-D in FIG. 13.

In some embodiments of the present disclosure, as illustrated in FIG. 8 to FIG. 10, the water flowing passage 201 may be formed in the water flowing pipe 220 and extend along an axial direction of the water flowing pipe 220, and the snap-fit member 500 may be in snap-fit connection with the water flowing pipe 220. In this way, the snap-fit member 500 can limit the positions of the water flowing pipe 220 and the support 600 in the axial direction of the water flowing pipe 220, respectively. Therefore, the snap-fit member 500 can be used to improve arranging reliability of the water flowing pipe 220, and the water flowing pipe 220 can be prevented from disengaging from the water dispensing member 100. Meanwhile, the snap-fit member 500 can improve arranging reliability of the support 600 and prevent the support 600 from disengaging from the housing 400, to guarantee the working performance of the water intake structure 1.

It should be understood that the snap-fit member 500 can limit the position of the water flowing pipe 220 in one or two of the axial directions of the water flowing pipe 220, and limit similarly for the support 600. For example, when the axial direction of the water flowing pipe 220 extends in a forward-backward direction, the snap-fit member 500 can limit the position of the water flowing pipe 220 in the forward direction and the backward direction to prevent the water flowing pipe 220 from moving forwards and backwards.

In some embodiments, as illustrated in FIG. 10, a snap-fit groove 202 is formed at an outer peripheral surface of the water flowing pipe 220. The snap-fit member 500 is substantially annular in shape, and is adapted to be sleeved over the outer peripheral wall of the water flowing pipe 220. The snap-fit member 500 is provided with a snap-fit protrusion 510 that is configured to be engaged in the snap-fit groove 202. In this way, it is possible to restrict movement of the water flowing pipe 220 away from the water dispensing member 100. For example, the water dispensing member 100 is disposed behind the water flowing pipe 220, and the snap-fit member 500 can restrict forward movement of the water flowing pipe 220. In this way, the water flowing pipe 220 can be prevented from disengaging from the water dispensing member 100 due to impact of water.

More specifically, one or more snap-fit grooves 202 may be provided, and one or more snap-fit protrusions 510 may be provided. The snap-fit protrusions 510 may be engaged in the snap-fit grooves 202 in a one-to-one correspondence.

In some embodiments, as illustrated in FIG. 9, the snap-fit member 500 is in contact fit with an end surface of the support 600 facing towards the water dispensing member 100 to prevent the support 600 from disengaging from the engagement recess 402. For example, the snap-fit member 500 is disposed behind the support 600 and has a front end that is in contact fit with a rear end surface of the support 600, to restrict the support 600 from moving backwards, thereby preventing the disengagement of the support 600 from the engagement recess 402 during the movement. In this way, it facilitates reliable position-limiting of the support 600 by the snap-fit member 500 and improves stability and reliability of assembling the support 600.

Figure 2:
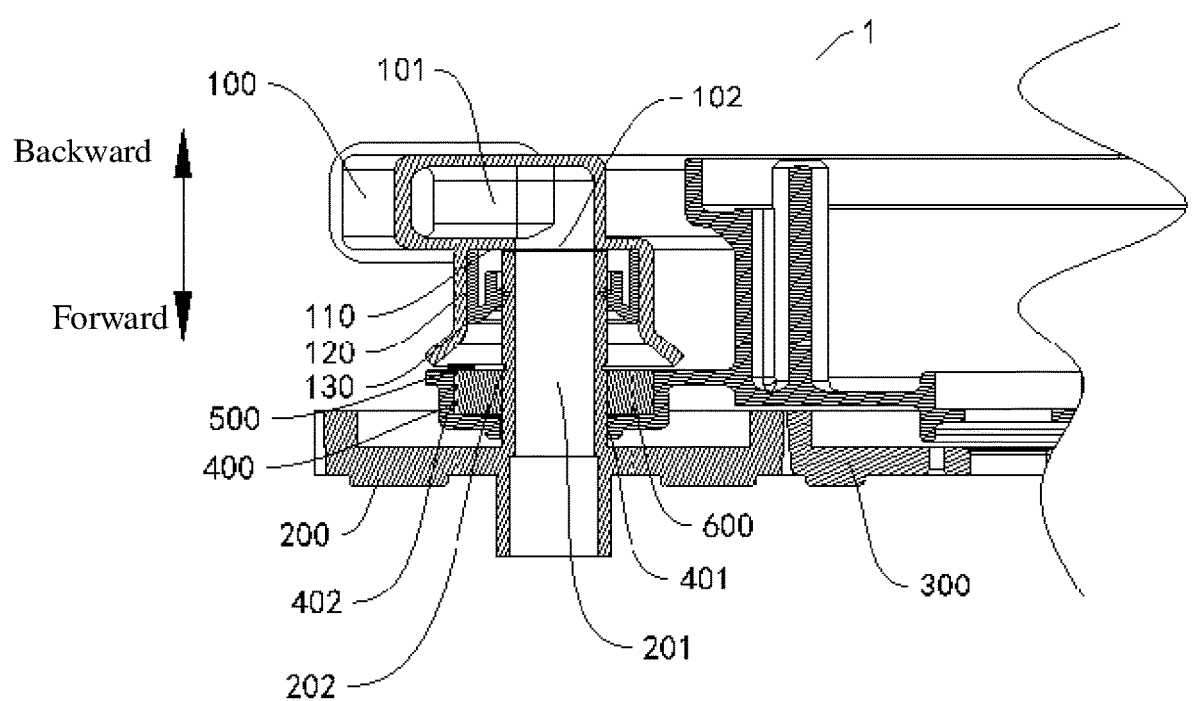
FIG. 2 is a partial sectional view along A-A in FIG. 1.

In some embodiments, as illustrated in FIG. 2, the water dispensing member 100 has a first engagement surface 110 that may be flat. The water outlet 102 is formed at the first engagement surface 110. An end of the water flowing pipe 220 in the axial direction of the water flowing pipe 220 is in contact fit with the first engagement surface 110, and another end of the water flowing pipe 220 in the axial direction of the water flowing pipe 220 is configured to be in transmission connection with the spray pipe 2. In this way, it is easy to position the water flowing pipe 220 to realize reliable engagement between the water flowing pipe 220 and the water dispensing member 100, and it facilitates to effectively seal a connection between the water flowing pipe 220 and the water dispensing member 100 to ensure a sealed and reliable waterflow path between the water flowing pipe 220 and the water dispensing member 100.

Figure 3:
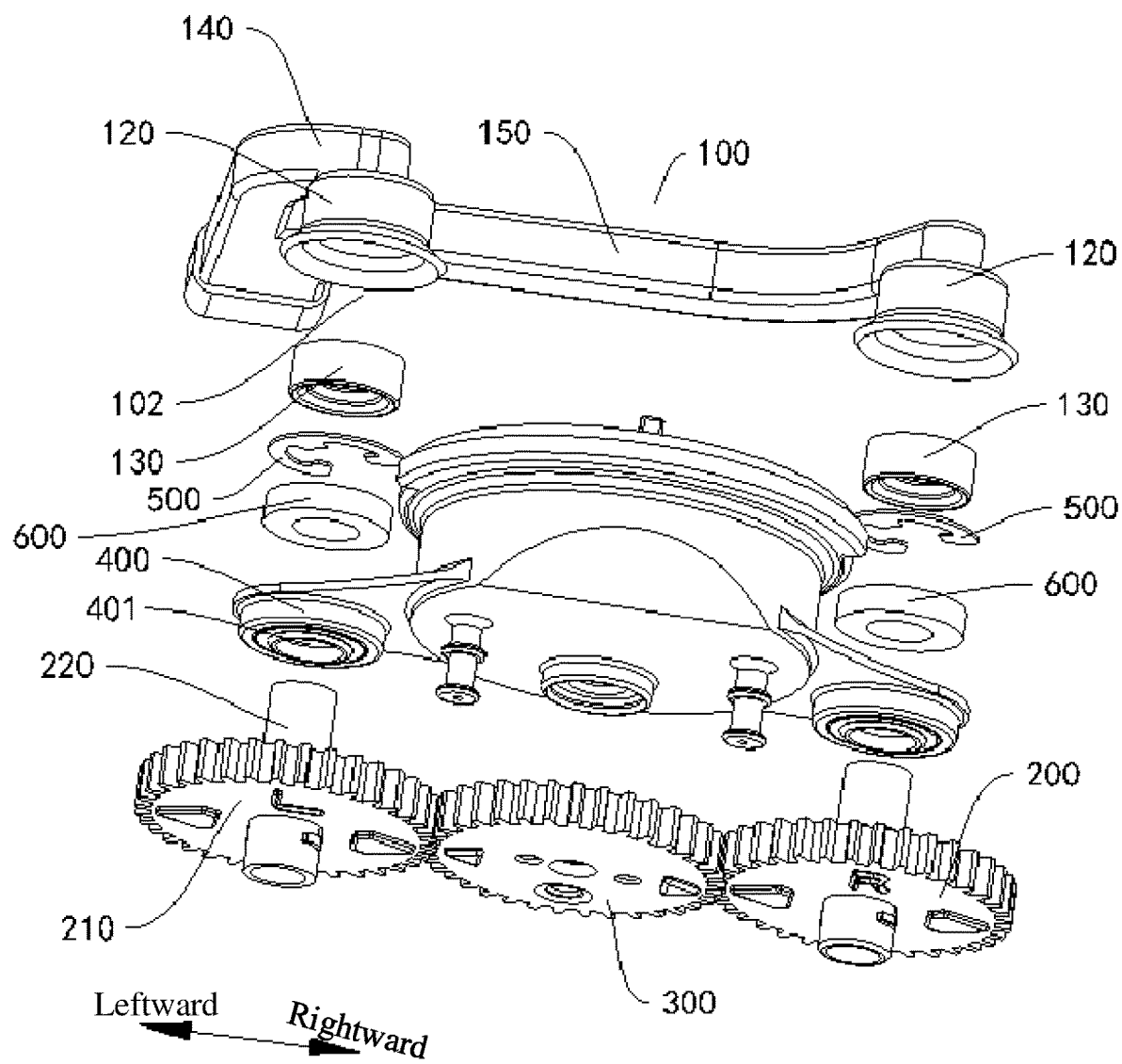
FIG. 3 is an exploded view of a water intake structure of a spray arm assembly according to some embodiments of the present disclosure.
Figure 4:
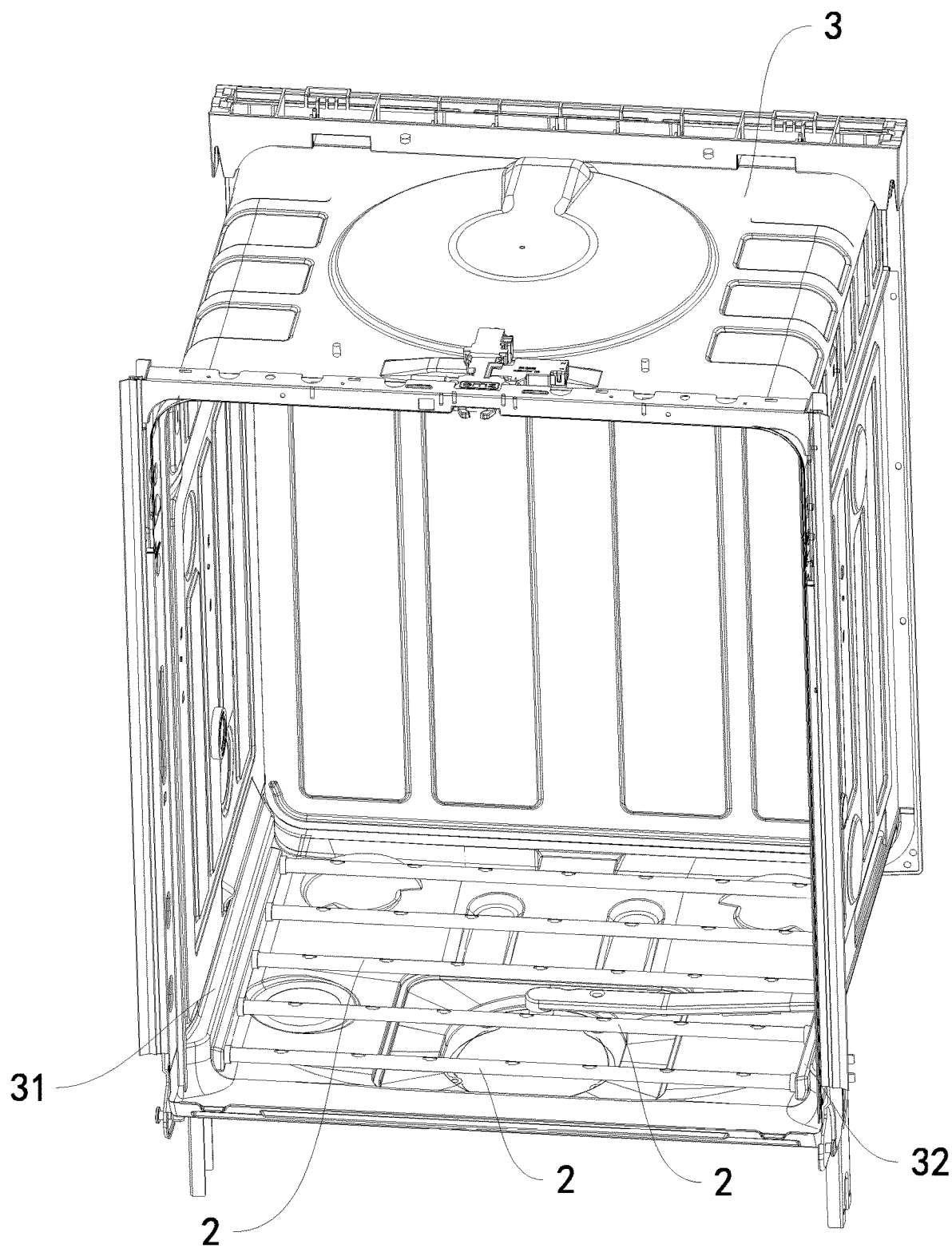
FIG. 4 is a schematic structural view of a dishwasher according to an embodiment of the present disclosure.
Figure 5:
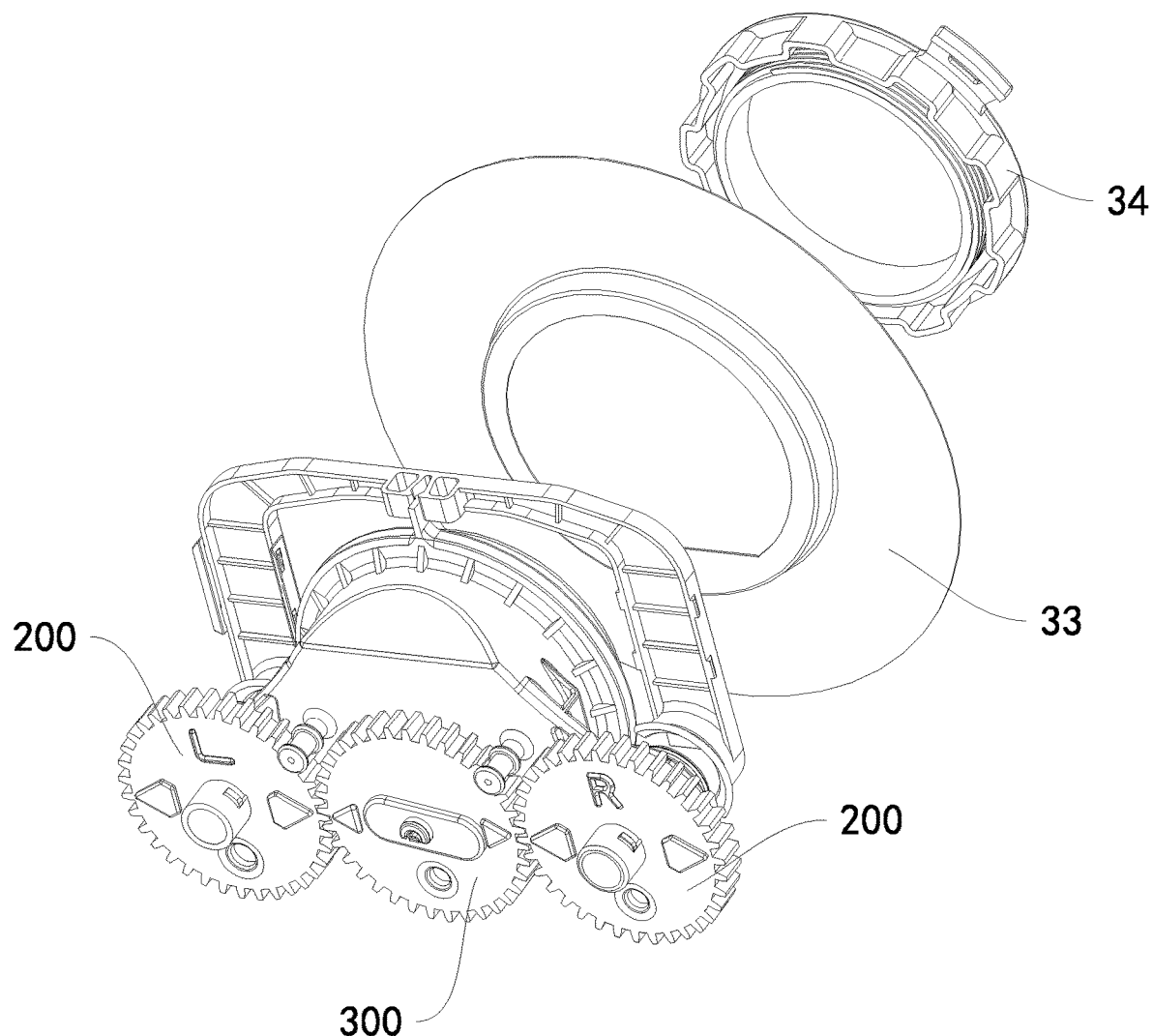
FIG. 5 is a partially exploded view of a spray arm assembly according to an embodiment of the present disclosure.
Figure 6:
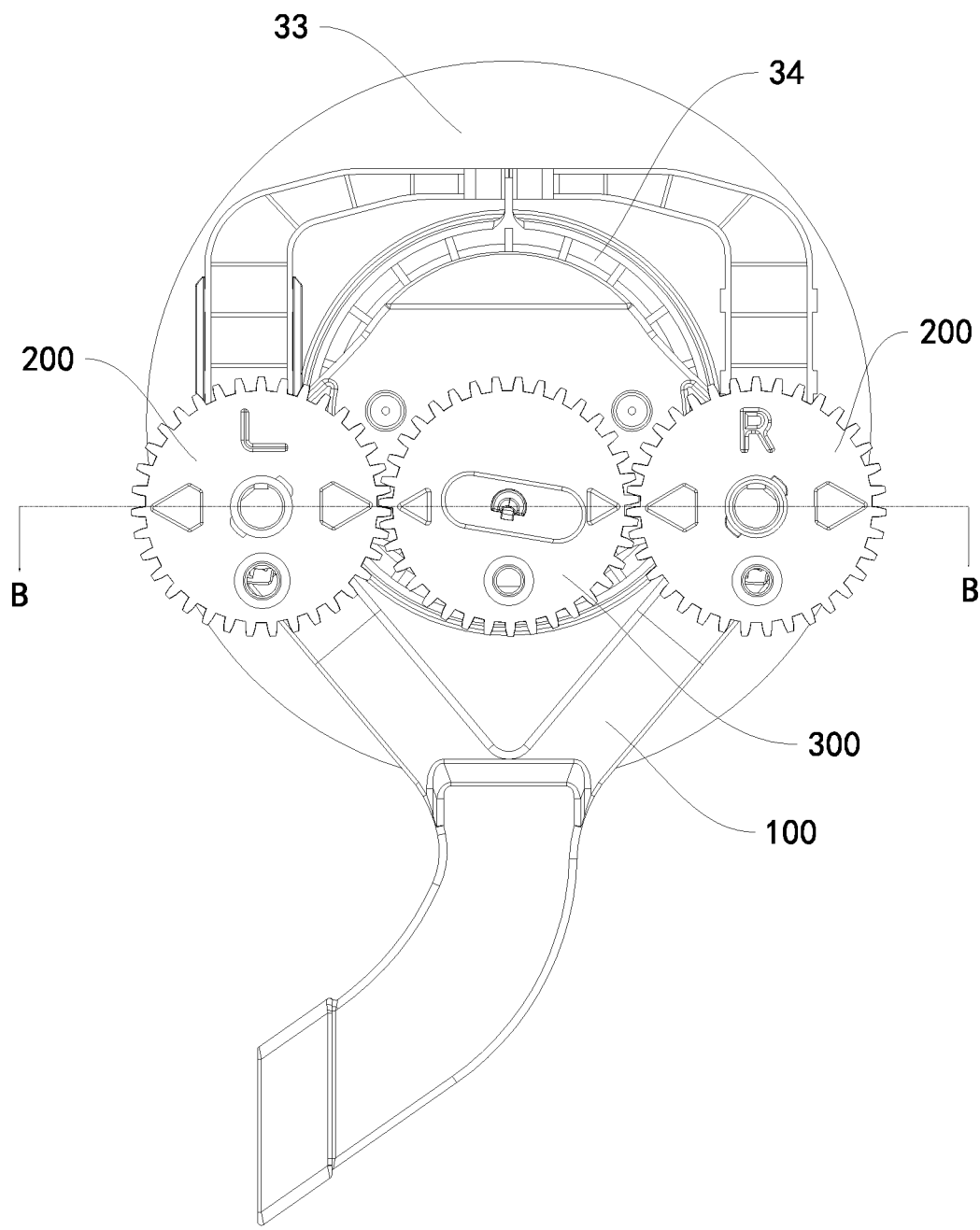
FIG. 6 is a schematic structural view showing a part of a spray arm assembly according to other embodiments of the present disclosure.
Figure 7:
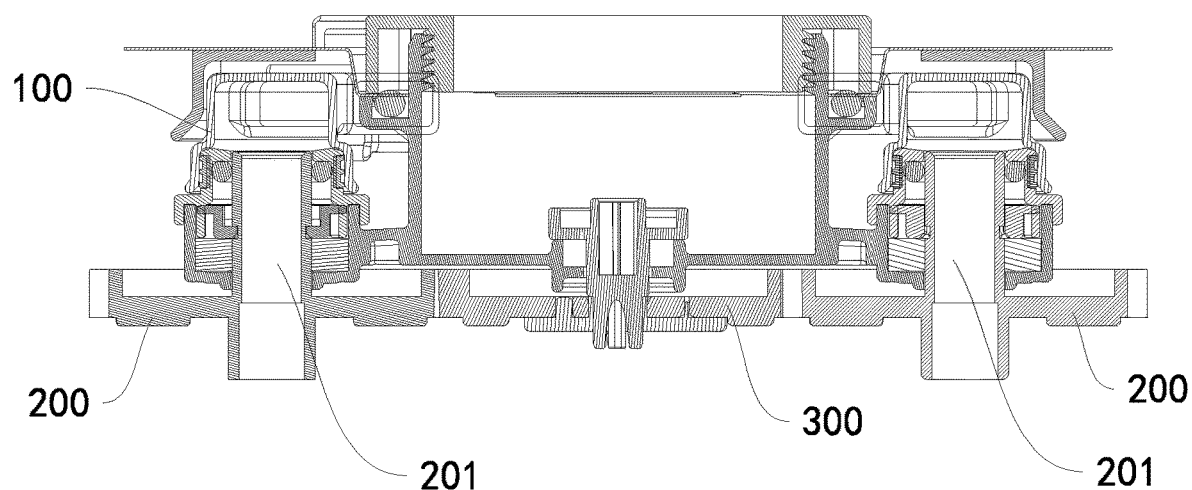
FIG. 7 is a sectional view along B-B in FIG. 6.

For example, the water dispensing member 100 is fixed to a rear sidewall of the washing cavity of the dishwasher. The forward-backward direction is illustrated in FIG. 2, and it should be understood that the forward-backward direction is only limited for facilitating the description of structure and is not limitation on the actual arrangement direction of the structure within the dishwasher of the present disclosure. The water dispensing member 100 extends substantially along an upright direction, and is provided with a water dispensing connector at a side thereof facing towards the water flowing pipe 220. The first engagement surface 110 is disposed at a front side of the water dispensing connector and is an uprightly extending plane. The water outlet 102 is formed on the first engagement surface 110. The water flowing pipe 220 has the water flowing pipe 201. A rear end face of the water flowing pipe 220 is in contact fit with the first engagement surface 110, and a front end face of the water flowing pipe 220 is in transmission connection with the spray pipe 2. The spray pipe 2 may be a circular pipe. A plurality of spray pipes 2 is provided, extends within the washing cavity along the forward-backward direction of the washing cavity, and is spaced apart from each other along a left-right direction. The left-right direction is shown in FIG. 3, and it should be understood that the left-right direction is only defined to facilitate the description of structure and is not limitation on the actual arrangement direction of the structure within the dishwasher of the present disclosure. The water flowing pipe 220 may be a circular pipe, and the interior of the water flowing pipe 220 may be formed with a water flowing passage 201 having openings at both sides in the axial direction of the water flowing pipe 220. As a result, the water flowing pipe 220 is in communication with the water dispensing member 100 and the spray pipe 2, respectively. This not only facilitates the positioning of the water flowing pipe 220 to achieve the reliable engagement between the water flowing pipe 220 and the water dispensing member 100, but also facilitates the effective sealing of the connection between the water flowing pipe 220 and the water dispensing member 100, thereby ensuring the sealed and reliable waterflow path between the water flowing pipe 220 and the water dispensing member 100.

In some embodiments, as illustrated in FIG. 2, the water intake structure 1 may further include a first seal 130. An engagement sleeve 120 is disposed on the first engagement surface 110 and extends towards the water flowing pipe 220. An inner peripheral wall of the engagement sleeve 120 and the outer peripheral wall of the water flowing pipe 220 are spaced apart from each other. The first seal 130 is disposed between the inner peripheral wall of the engagement sleeve 120 and the outer peripheral wall of the water flowing pipe 220. In this way, the assembly of the water flowing pipe 220 can be positioned and guided by providing the engagement sleeve 120, to facilitate accurate mounting of the water flowing pipe 220. Furthermore, an arrangement space of the first seal 130 can be formed to ensure reliability of providing the first seal 130. Thus, it facilitates to seal the connection between the water flowing pipe 220 and the water dispensing member 100 by means of the first seal 130, to improve the sealing effect and avoid the occurrence of water leakage.

For example, the engagement sleeve 120 is disposed on the first engagement surface 110, extends forwards, and has a rear end connected to the first engagement surface 110 and a front end with an opening. The water flowing pipe 220 is adapted to be engaged and mounted in the engagement sleeve 120 through the opening. Moreover, the engagement sleeve 120 and the water flowing pipe 220 are spaced apart from each other. Further, the engagement sleeve 120 may include a straight section and a flared section connected to the straight section. A cross-sectional area of the flared section is greater than a cross-sectional area of the straight section, and the flared section is located in front of the straight section. The first seal 130 is detachably disposed in the straight section and is formed as a closed sealing ring, and the sealing ring is sleeved over on the outer side of the water flowing pipe 220. After mounting, the sealing ring has an inner peripheral surface adapted to be in press fit with the water flowing pipe 220 and an outer peripheral surface adapted to be in press fit with an inner peripheral wall of the straight section.

In some embodiments, as illustrated in FIG. 3, a gear component 200 may include a drive member 210 and the water flowing pipe 220. The drive member 210 is configured to be in transmission fit with an upstream transmission member. The water flowing pipe 220 is connected to the drive member 210. The water flowing passage 201 is formed in the water flowing pipe 220. It should be understood that the drive member 210 and the water flowing pipe 220 may be two independently structural members or an integral member. In this way, not the water flowing pipe 220 can transmit power to drive the spray pipe 2 to rotate, and supply water to the spray pipe 2 to ensure normal operation of the spray pipe 2.

For example, the drive member 210 and the water flowing pipe 220 are integrally formed as a driven gear member, and the upstream transmission member may be formed as a driving gear member. The driven gear member includes the drive member 210 and the water flowing pipe 220. Driven teeth are formed at an outer edge of the drive member 210. The drive member 210 may be in transmission connection with the driving gear member through the driven teeth. A through hole is formed in a middle portion of the drive member 210 and penetrates along a thickness direction of the drive member 210. The water flowing pipe 220 may pass through the through hole. The water flowing passage 201 is formed in the water flowing pipe 220 and in communication with the water dispensing member 100 and the spray pipe 2. In this way, the water flowing pipe 220 can transmit the power to drive the spray pipe 2 to rotate, and supply water to the spray pipe 2 to ensure the normal operation of the spray pipe 2.

In some embodiments, as illustrated in FIG. 2, the snap-fit member 500 is an annular snapping plate. The engagement recess 402 is opened towards the water dispensing member 100. The annular snapping plate has an inner end formed as the snap-fit protrusion 510 and an outer end adapted to be in contact fit with the housing 400. In this way, the snap-fit member 500 can be positioned to facilitate the snap-fit between the water flowing pipe 220 and the snap-fit member 500 and improvement of the assembly efficiency and connection strength.

For example, the snap-fit groove 202 is formed on the outer peripheral surface of the water flowing pipe 220 and extends along a circumferential direction of the water flowing pipe 220. The snap-fit member 500 may be formed as the annular snapping plate. The annular snapping plate has a notch extending along an axial direction of the annular snapping plate and may generate elastic deformation. After the annular snapping plate is mounted, the annular snapping plate is caught around the outer peripheral surface of the water flowing pipe 220 to achieve a reliable connection between the annular snapping plate and the water flowing pipe 220. Further, an inner end of the annular snapping plate in a radial direction of the annular snapping plate is adapted to be engaged in the snap-fit groove 202, and an outer end of the annular snapping plate in the radial direction of the annular snapping plate is adapted to be in snap fit with the housing 400 to limit the position in the axial direction of the water flowing pipe 220. In this way, the snap-fit member 500 can be positioned to facilitate the snap-fit between the water flowing pipe 220 and the snap-fit member 500 and the improvement of the assembly efficiency and connection strength.

In other embodiments of the present disclosure, as illustrated in FIG. 10, the water intake structure 1 may further include a fixing cover 700. The fixing cover 700 is fixedly connected to the water dispensing member 100 and the housing 400, respectively, and has a position-limiting hole 710. The water flowing pipe 220 is adapted to be disposed and extending in the position-limiting hole 710. For example, the water intake structure 1 may further include the fixing cover 700. The fixing cover 700 is fixed to the housing 400 by a rotation-snapping structure and snap-fitted to the water dispensing member 100. The fixing cover 700 may be formed with the position-limiting hole 710, and the water flowing pipe 220 is adapted to be disposed and extend within the position-limiting hole 710. In this way, the water flowing pipe 220 can be limited by the fixing cover 700, to prevent the water flowing pipe 220 from shaking and prolong reliability life of the water flowing pipe 220.

In some embodiments, as illustrated in FIG. 10, a mounting cavity 720 is defined by the fixing cover 700, the housing 400, and the water flowing pipe 220. The snap-fit member 500 may be disposed in the mounting cavity 720 to facilitate mounting and arrangement of connection members.

More specifically, as illustrated in FIG. 10, a second seal 730 is disposed in the mounting cavity 720 and sandwiched between the water flowing pipe 220 and the fixing cover 700. The fixing cover 700 has an accommodation groove 740. A third seal 750 is disposed in the accommodation groove 740 and sandwiched between the fixing cover 700 and the water dispensing member 100. In this way, the second seal 730 is provided to prevent the washing water from entering the support 600. As the washing water is somewhat dirty, dregs will accumulate on an inner surface of the housing 400 of the support 600 after long-term use, which may affect rotation of glass balls of the support 600, thereby causing the reliability of the support 600 to decrease. Furthermore, the third seal 750 is provided to prevent the washing water from leaking out of the connection between the fixing cover 700 and the water dispensing member 100.

In an embodiment, as illustrated in FIG. 10, the snap-fit member 500 may be a pull ring. The pull ring is provided with a position-limiting boss. A position-limiting engagement boss 221 is disposed on the outer peripheral surface of the water flowing pipe 220 and engaged with the position-limiting boss. The position-limiting boss and the snap-fit protrusion 510 are spaced apart from each other in an axial direction of the pull ring. In this way, the engagement relationship between the water flowing pipe 220 and the snap-fit member 500 can restrict the water flowing pipe 220 to move toward the water dispensing pipe or away from the water dispensing pipe, to further improve accuracy and stability of arrangement of the water flowing pipe 220. It should be understood herein that the pull ring may be elastically deformed. After the pull ring is mounted, the pull ring may catch around the outer peripheral surface of the water flowing pipe 220.

In some exemplary embodiments, the fixing cover 700 may be fixed to the housing 400 by means of the rotation-snapping structure. The second seal 730 is mounted at another end of the fixing cover 700, and the fixing cover 700 is fixed to the water dispensing member 100 through a fastening fixture. The second seal 730 functions to prevent the washing water from entering the support 600. As the washing water is somewhat dirty, over time, dregs will accumulate on the inner surface of the housing 400 of the support 600 after long-term use, which may affect the rotation of the glass balls of the support 600, thereby causing the reliability of the support 600 to decrease. Meanwhile, the function of providing the fixing cover 700 is to prevent the water flowing pipe 220 from shaking and to improve the reliability life of the water flowing pipe 220.

In some embodiments, a rotation axis of the water flowing pipe 220 extends in the axial direction of the water flowing pipe 220. In other words, the rotation axis of the water flowing pipe 220 extends along a length direction of the water flowing pipe 220, i.e., the water flowing pipe 220 rotates about a central axis thereof. In this way, the water flowing pipe 220 can drive the spray pipe 2 to rotate in the axial direction of the water flowing pipe 220.

More specifically, the spray pipe 2 can rotate along the central axis thereof, i.e., the rotation axis of the spray pipe 2 extends along a length direction of the spray pipe 2. An end of the spray pipe 2 in the length direction of the spray pipe 2 is connected to an end of the water flowing pipe 220, the water flowing pipe 220 drives the spray pipe 2 to rotate together, and the rotation axis of the spray pipe 2 coincides with the rotation axis of the water flowing pipe 220.

For example, the water flowing pipe 220 is a circular pipe and has the axial direction along the forward-backward direction, and the rotation axis of the water flowing pipe 220 also extends along the forward-backward direction. The spray pipe 2 is a circular pipe and has the axial direction along the forward-backward direction, and the rotation axis of the spray pipe 2 also extends along the forward-backward direction. A rear end of the spray pipe 2 in the axial direction of the spray pipe 2 is connected to a front end of the water flowing pipe 220, the water flowing pipe 220 drives the spray pipe 2 to rotate synchronously, and the rotation axis of the spray pipe 2 coincides with the rotation axis of the water flowing pipe 220.

In an embodiment, as illustrated in FIG. 3, the water intake structure 1 further includes the drive member 210 configured to drive the water flowing pipe 220 to rotate. Further, the drive member 210 may be a gear member. The water flowing pipe 220 penetrates the middle portion of the drive member 210. The water flowing pipe 220 and the drive member 210 are integrally formed. The water flowing pipe 220 includes a first pipe section and a second pipe section, the first pipe section is located on a side of the drive member 210 and adapted to engage with the water dispensing member 100, and the second pipe section is located on another side of the drive member 210 and adapted to be in transmission connection with the spray pipe 2. In this way, waterflow communication between the water flowing pipe 220 and the water dispensing member 100 and waterflow communication between the water flowing pipe 220 and the spray pipe 2 can be realized, and the reliable rotation of the water flowing pipe 220 can be ensured, thereby improving reliability and stability of the transmission of the water flowing pipe 220.

For example, the water flowing pipe 220 and the drive member 210 may be integrally formed to be a gear component 200. The drive member 210 may be formed as a gear structure having meshing teeth. The water flowing pipe 220 may be disposed in the middle portion of the gear structure and penetrates the gear structure. The water flowing pipe 220 includes the first pipe section and the second pipe section. The first pipe section is located on a rear side of the gear close to the water dispensing member 100 and is rotatably connected to the water dispensing member 100, and the second pipe section is located on a front side of the gear close to the spray pipe 2 and is fixedly connected to the spray pipe 2. This can facilitate to achieve the waterflow communication between the water flowing pipe 220 and the water dispensing member 100 and the waterflow communication between the water flowing pipe 220 and the spray pipe 2, and facilitate to ensure the reliable rotation of the water flowing pipe 220, thereby improving the reliability and stability of the transmission of the water flowing pipe 220.

In some embodiments, as illustrated in FIG. 1, the water intake structure 1 further includes a drive motor and a transmission member 300. The transmission member 300 is in transmission connection with the drive motor and the drive member 210, respectively. In this way, the transmission member 300 can be driven by the drive motor to rotate and transmit power to the water flowing pipe 220, thereby enabling the water flowing pipe 220 to drive the spray pipe 2 to rotate.

In an embodiment, the transmission member 300 is in transmission connection with a motor shaft of the drive motor. The drive member 210 is provided with first engagement teeth. The transmission member 300 is provided with second engagement teeth that are adapted to mesh with the first engagement teeth. In this way, it is possible to achieve tooth-meshing transmission between the transmission member 300 and the drive member 210, improve transmission efficiency and transmission reliability between the drive member 210 and the transmission member 300, and prevent transmission delay from occurring during the transmission.

For example, the water intake structure 1 may include the drive motor, the transmission member 300, the drive member 210, and the water flowing pipe 220. The transmission member 300 may be formed as the driving gear member, the drive member 210 may be formed as the driven gear member, and the driving gear member is fixedly connected to the motor shaft of the drive motor to enable the driving gear member to rotate synchronously along with the motor shaft. The second engagement teeth of the driving gear member are in meshing transmission with the first engagement teeth of the driven gear member, to enable the driving gear member to drive the driven gear member to rotate.

In some embodiments, as illustrated in FIG. 3, the housing 400 is fixedly disposed in the washing cavity of the dishwasher. The housing 400 has the mounting opening 401 penetrating the housing 400 in a thickness direction of the housing 400, and the water flowing pipe 220 is adapted to pass through the mounting opening 401 and be in contact fit with the water dispensing member 100. The snap-fit member 500 is in snap fit with the water flowing pipe 220 and is in contact fit with the housing 400. In this way, the water flowing pipe 220 can be supported by the housing 400 to facilitate the mounting and arrangement of the water flowing pipe 220, and the water flowing pipe 220 can be limited by means of the water dispensing member 100 and the snap-fit member 500, to avoid movement of the water flowing pipe 220 in the axial direction thereof and ensure the arrangement reliability of the water flowing pipe 220.

For example, the water flowing pipe 220 is rotatable relative to the water dispensing member 100 and the housing 400. In an embodiment, the housing 400 may be formed with the mounting opening 401, and an end of the water flowing pipe 220 close to the water dispensing member 100 passes through the mounting opening 401 to be in contact fit with the water dispensing member 100, to limit the position of the water flowing pipe 220 in the axial direction of the water flowing pipe 220 to avoid the backward movement of the water flowing pipe 220. The snap-fit member 500 is in snap-fit with the water flowing pipe 220 and in contact fit with the housing 400 to limit the position of the water flowing pipe 220 in the axial direction of the water flowing pipe 220, to prevent the water flowing pipe 220 from moving forwards and disengaging from the water dispensing member 100. In this way, the water flowing pipe 220 can be supported by the housing 400 to facilitate the mounting and arrangement of the water flowing pipe 220. The position of the water flowing pipe 220 can be limited by the water dispensing member 100 and the snap-fit member 500, to avoid the movement of the water flowing pipe 220 in the axial direction thereof and ensure the arrangement reliability of the water flowing pipe 220.

In an embodiment, as illustrated in FIG. 2, the housing 400 has the engagement recess 402, and the support 600 is adapted to be detachably engaged in the engagement recess 402 and sleeved outside the water flowing pipe 220. In this way, the support 600 is provided to reduce a rotation friction and wear of the water flowing pipe 220 and improve the transmission efficiency and transmission precision.

For example, the housing 400 has the engagement recess 402 at the mounting opening 401. The engagement recess 402 is disposed around the mounting opening 401. The support 600 is detachably engaged in the engagement recess 402. The water flowing pipe 220 rotatably passes through the interior of the support 600. In this way, the support 600 is provided to reduce the rotation friction and wear of the water flowing pipe 220 and improve the transmission efficiency and transmission precision.

Further, as illustrated in FIG. 2, the engagement recess 402 is opened towards the water dispensing member 100 to facilitate the mounting and arrangement of the support 600. The snap-fit member 500 is in contact fit with an edge of the engagement recess 402 to limit the position of the snap-fit member 500 through the housing 400. In this way, the axial movement of the water flowing pipe 220 can be limited by the snap-fit member 500 to improve positioning reliability of the water flowing pipe 220, and the position of the support 600 can be limited by the snap-fit member 500 to prevent the support 600 from disengaging from the engagement recess 402.

For example, the engagement recess 402 is opened towards a rear side of the water dispensing member 100 to facilitate the mounting and arrangement of the support 600. An outer edge of the snap-fit member 500 in a radial direction of the snap-fit member 500 is in contact fit with the edge of the engagement recess 402 to limit the position of the snap-fit member 500 through the housing 400, to axially limit the position of the water flowing pipe 220. In this way, the axial movement of the water flowing pipe 220 can be limited by the snap-fit member 500 to improve the positioning reliability of the water flowing pipe 220, and the position of the support 600 can be limited by the snap-fit member 500 to prevent the disengagement of the support 600 from the engagement recess 402.

In some embodiments, as illustrated in FIG. 3, the water dispensing member 100 may include a first water-intake pipe section 140 and a second water-intake pipe section 150. The first water-intake pipe section 140 and the second water-intake pipe section 150 each have a water intake passage 101. Two water flowing pipes 220 are provided and engaged with the first water-intake pipe section 140 and the second water-intake pipe section 150, respectively. In this way, the water can be supplied to the two water flowing pipes 220 through one water dispensing member 100, to further facilitate integration of the water intake structure 1, thereby making the internal structure of the dishwasher more compact.

For example, the water dispensing member 100 may include the first water-intake pipe section 140 and the second water-intake pipe section 150. The first water-intake pipe section 140 and the second water-intake pipe section 150 both have the water intake passage 101. The two water intake passages 101 are provided and disposed on a left side and a right side of the transmission member 300, respectively. The transmission member 300 can drive the two water flowing pipes 220 to rotate simultaneously. One of the two water flowing pipes 220 is in communication with the first water-intake pipe section 140, and another one of the two water flowing pipes 220 is in communication with the second water-intake pipe section 150. The two water flowing pipes 220 are symmetrical in structure. In this way, the water can be supplied to the two water flowing pipes 220 through one water dispensing member 100, to further facilitate the integration of the water intake structure 1, thereby making the internal structure of the dishwasher more compact.

According to some exemplary embodiments of the present disclosure, the spray arm assembly is a spray arm assembly structure having an elongated spray pipe 2, and may include the water intake structure 1 and the spray pipe 2. The spray pipe 2 may be a circular pipe and rotate along its own axis. The rotation of the spray pipe 2 is controlled successively by the drive motor, the transmission member 300, and the drive member 210. That is, the drive motor drives the transmission member 300 to rotate, the transmission member 300 drives the drive member 210 to rotate, the drive member 210 then drives the water flowing pipe 220 to rotate, and the water flowing pipe 220 drives the spray pipe 2 to rotate.

The drive motor may be assembled in a cavity of the housing 400. The water entering the spray pipe 2 is supplied by the water dispensing member 100 and the water flowing pipe 220, and the water flowing pipe 220 and the drive member 210 may be formed integrally to be a driven gear component 200. That is, the inflowing water flows sequentially through the water dispensing member 100 and the driven gear component 200, and then enters the spray pipe 2 and is sprayed out of the spray pipe 2. Another end of the driven gear component 200 is connected to the elongated spray pipe 2, and the elongated spray pipe 2 is fixedly connected to the driven gear component 200. As a result, the spray pipe 2 can rotate synchronously with the driven gear component 200.

When the water intake structure 1 is assembled, two supports 600 may be firstly fitted into a left casing and a right casing of the housing 400, respectively. The driven gear member passes through the mounting opening 401 of the housing 400 to be assembled with the support 600. Thereafter, the snap-fit member 500 is snap-fitted to the driven gear member to assembly a gear module. The first seal 130 may be then assembled into and fixed to the water dispensing member 100 to assembly a water dispensing module. Finally, the assembled gear module is fitted to the water dispensing module. The dishwasher may further include a back plate 33, and the housing 400 may be fixed on the back plate 33 of the dishwasher by screws to fix the entire water intake structure 1.

In an embodiment, the function of the snap-fit member 500 is to pull the water flowing pipe 220 to prevent the water flowing pipe 220 from disengaging from the water dispensing member 100 due to the impact of water, and the snap-fit member 500 may be made of stainless steel. The function of the first seal 130 is to prevent water leakage at the connection between the water flowing pipe 220 and the water dispensing member 100. The support 600 may be replaced by a plastic annular structure. Another side of the driven gear member may abut against an end of the elongated spray pipe 2 in the length direction thereof.

According to an exemplary embodiment of the present disclosure, the water intake structure 1 of the spray arm assembly may be applied in the dishwasher. In some embodiments, the water intake structure 1 may be mounted in the washing cavity of the dishwasher. The water intake structure 1 may include the water dispensing member 100, the drive member 210, and the water flowing pipe 220. The spray arm assembly may include the water dispensing member 100, the water flowing pipe 220, and a plurality of spray pipes 2. The water dispensing member 100 may be fixedly disposed in the dishwasher and be configured to supply water to the dishwasher. An end of the water dispensing member 100 may be connected to the external water source, and another end of the water dispensing member 100 may be connected to the water flowing pipe 220. In this way, the water dispensing member 100 can supply the water flowing pipe 220 with water. The water flowing pipe 220 is rotatable relative to the water dispensing member 100, i.e., the water flowing pipe 220 is rotatably disposed in the dishwasher. The water flowing pipe 220 drives the spray pipes 2 to rotate together. The spray pipes 2 are in transmission connection with and are in fluid communication with the water flowing pipe 220. In this case, the inflowing water of the spray arm assembly can flow through the water dispensing member 100 and the water flowing pipe 220, and then flow into the spray pipes 2. The spray apertures are formed in the pipe wall of the spray pipe 2 and configured to spray the waterflow, and the spray pipes 2 can rinse the dishes to be washed in the washing cavity. Meanwhile, the water flowing pipe 220 can drive the spray pipes 2 to rotate, to increase the spraying range of the spray pipes 2.

The water dispensing member 100 of the water intake structure 1 may include the water intake passage 101 and the water inlet and water outlet 102 that are in communication with the water intake passage 101. The water inlet may be connected to the tap of the external water source. The water flowing pipe 220 is configured to drive the spray pipe 2 of the spray arm assembly to rotate, is rotatable relative to the water dispensing member 100, and have the water flowing passage 201. The water flowing passage 201 has an end in communication with the water outlet 102 and another end connected to the spray pipe 2.

The first engagement surface 110 is disposed at a side of the water dispensing member 100 facing towards the water flowing pipe 220, and the water outlet 102 may be formed on the first engagement surface 110. The water flowing pipe 220 may have the water flowing pipe 220, an end surface of the end of the water flowing pipe 220 close to the water dispensing member 100 is in contact fit with the first engagement surface 110, and the other end of the water flowing pipe 220 is in transmission connection with the spray pipe 2. The water flowing pipe 220 may be a circular pipe. The water flowing passage 201 with openings in two sides may be formed in the water flowing pipe 220. As a result, the water flowing pipe 220 is in communication with the water dispensing member 100 and the spray pipe 2, respectively.

The first engagement surface 110 may be provided with the engagement sleeve 120, which extends towards the water flowing pipe 220. The engagement sleeve 120 may include the straight section and the flared section connected to the straight section. The first seal 130 may be disposed in the straight section and formed as the sealing ring. The sealing ring is sleeved over the outer side of the water flowing pipe 220. The inner peripheral surface of the sealing ring may be in press fit with the water flowing pipe 220, and the outer peripheral surface of the sealing ring may be in press fit with the inner peripheral wall of the straight section.

The water flowing pipe 220 may be the driven gear component. The driven gear member may include the drive member 210 and the water flowing pipe 220. The drive member 210 may be formed with the driven teeth and in transmission connection with the driving gear through the engagement teeth. The water flowing pipe 220 penetrates the middle portion of the drive member 210. The water flowing passage 201 is formed in the water flowing pipe 220 and is in communication with a water spraying pipe and the spray pipe 2. The rotation axis of the water flowing pipe 220 may extend along the length direction of the water flowing pipe 220.

The drive member 210 and the water flowing pipe 220 may be integrally formed to be the gear component 200. The drive member 210 may be formed as a gear structure. The water flowing pipe 220 is disposed in the middle portion of the gear and passes through the gear, and may include the first pipe section and the second pipe section. The first pipe section may be located on a side of the gear close to the water dispensing member 100 and rotatably connected to the water dispensing member 100. The second pipe section may be located on another side of the gear close to the spray pipe 2 and fixedly connected to the spray pipe 2.

The water intake structure 1 may include the drive motor, the transmission member 300, and the water flowing pipe 220. The transmission member 300 may be formed as the driving gear member. The drive member 210 may be formed as the driven gear member. The driving gear member is fixedly connected to the motor shaft of the drive motor. The second engagement teeth of the driving gear member are in meshing transmission with the first engagement teeth of the driven gear member.

The water intake structure 1 may include the water dispensing member 100 fixedly disposed in the washing cavity, the housing 400, and the water flowing pipe 220 that is rotatable relative to the water dispensing member 100 and the housing 400. In an embodiment, the housing 400 may have the mounting opening 401, and the end of the water flowing pipe 220 close to the water dispensing member 100 passes through the mounting opening 401 to be in contact fit with the water dispensing member 100, to limit the position of the water flowing pipe 220 in the axial direction thereof, thereby preventing the water flowing pipe 220 from moving in a direction toward the water dispensing member 100. The snap-fit member 500 is in snap-fit with the water flowing pipe 220 and in contact fit with the housing 400, to limit the position of the water flowing pipe 220 in the axial direction thereof, thereby preventing the water flowing pipe 220 from moving in a direction away from the water dispensing member 100.

The outer peripheral surface of the water flowing pipe 220 may have an annular snap-fit groove 202. The snap-fit member 500 may be an annular snapping plate. The annular snapping plate has a circumferential notch and can elastically deform. After the annular snapping plate is mounted, the annular snapping plate catches around the outer peripheral surface of the water flowing pipe 220. Further, the inner end of the annular snapping plate in the radial direction of the annular snapping plate is adapted to be engaged in the snap-fit groove 202, and the outer end of the annular snapping plate in the radial direction of the annular snapping plate is adapted to be in snap fit with the housing 400, to limit the position of the water flowing pipe 220 in the axial direction thereof.

The water intake structure 1 may further include the support 600. The housing 400 has the engagement recess 402 disposed around the mounting opening 401, and the water flowing pipe 220 rotatably passes through the interior of the support 600. The engagement recess 402 is opened towards the water dispensing member 100 to facilitate the mounting and arrangement of the support 600. The snap-fit member 500 is in contact fit with the edge of the engagement recess 402.

The water dispensing member 100 may include the first water-intake pipe section 140 and the second water-intake pipe section 150. The first water-intake pipe section 140 and the second water-intake pipe section 150 both have the water intake passage 101. Two water flowing pipes 220 are provided, and are disposed on the left and right sides of the transmission member 300, respectively. The transmission member 300 drives the two water flowing pipes 220 to rotate simultaneously. One of the two water flowing pipes 220 is connected to the first water-intake pipe section 140, and another one of the two water flowing pipes 220 is connected to the second water-intake pipe section 150. The two water flowing pipes 220 are symmetrical in structure.

A spray arm assembly of a household appliance according to an embodiment of the present disclosure is described below. The spray arm assembly of the household appliance according to an embodiment of the present disclosure includes a water intake structure 1 and spray pipes 2. The water intake structure 1 is the water intake structure 1 of the spray arm assembly according to the above embodiments of the present disclosure. The spray pipes 2 are fixedly connected to the water flowing pipe 220. A rotation axis of each of the spray pipe 2 is parallel to an axis of the spray pipe 2. The spray pipe 2 has a water flowing cavity 21 in communication with the water flowing passage 201.

For example, the household appliance may be a household appliance such as a dishwasher, a steam sterilizer, and a clothing treatment device.

In an embodiment, the dishwasher may include an inner tank assembly 3, and a washing cavity is formed in the inner tank assembly 3. The spray pipes 2 may be transversely arranged and fixed in the washing cavity, or may be longitudinally arranged and fixed in the washing cavity. Meanwhile, the spray pipe 2 may rotate along its own axis and is driven by a driving module to rotate. The driving module may include a drive motor and a gear transmission mechanism. The gear transmission mechanism may include the drive member 210 and the transmission member 300. The transmission member 300 may be formed as a driving gear member. The drive member 210 may be formed as a driven gear member. The driving gear member is fixedly connected to the motor shaft of the drive motor to rotate along with the motor shaft. The driving module may be mounted and fixed in the washing cavity by screws or a threaded structure.

In an embodiment, an elongated spray pipe 2 may be transversely arranged and fixed in the washing cavity, or be longitudinally arranged and fixed in the washing cavity. A first fixing member 31 and a second fixing member 32 are disposed in the washing cavity, and the elongated spray pipe 2 may be pre-fixed between the first fixing member 31 and the second fixing member 32. The first fixing member 31, the second fixing member 32 and the elongated spray pipe 2 are then assembled in the washing cavity. The first fixing member 31 and the second fixing member 32 may be fixed in the washing cavity through screws.

The elongated spray pipe 2 can be fixed to the water flowing pipe 220 through a fixing buckle 23 and a fixing ring 22. In an embodiment, the fixing ring 22, the sealing ring 24 and the fixing buckle 23 may be sequentially mounted on the elongated spray pipe 2. A first engagement hole is disposed on an outer peripheral surface of the spray pipe 2. A first engagement protrusion is disposed on an inner peripheral surface of the fixing buckle 23. The first engagement protrusion may be in snap-fit with the first engagement hole. Thereafter, the elongated spray pipe 2 is mounted to the water flowing pipe 220. A second engagement protrusion is disposed on an outer peripheral surface of the water flowing pipe 220. A second engagement hole is disposed on an inner peripheral surface of the fixing ring 22. The fixing ring 22 is fixed to the water flowing pipe 220 by means of an overhanging engagement to prevent the elongated spray pipe 2 from disengagement.

In some embodiments, the dishwasher may include a back plate 33 and a male threaded cover 34, and the driving module is fixedly connected to the back plate 33 in a threaded fixing manner. In an embodiment, internal threads of the driving module are engaged with the male threaded cover 34 behind the back plate 33. The driving module is firstly mounted in a round hole of the back plate 33, and the male threaded cover 34 is then threadedly fixed to the driving module behind the back plate 33. In this way, the driving module can be fixed on the back plate 33.

With the spray arm assembly of the household appliance according to an embodiment of the present disclosure, the water intake structure 1 of the spray arm assembly according to an embodiment of the present disclosure can supply water to the spray pipe 2 through the water flowing pipe 220 and drive the spray pipe 2 to rotate, and has the advantages of providing a compact and reliable structure and so on.

A dishwasher according to an embodiment of the present disclosure is described below. The dishwasher according to an embodiment of the present disclosure includes the spray arm assembly of the household appliance according to the above embodiments of the present disclosure.

With the dishwasher according to an embodiment of the present disclosure, the spray arm assembly of the household appliance according to the above embodiments of the present disclosure is provided to enable the water intake structure 1 to supply water to the spray pipe 2 through the water flowing pipe 220 and drive the spray pipe 2 to rotate, and has the advantages of providing a compact and reliable structure and so on.

Other arrangements and operations of the dishwasher according to the embodiments of the present disclosure are known to those skilled in the art, and the description thereof in detail will be omitted herein.

In the description of the present disclosure, it is to be understood that, terms such as "center", "longitudinal", "lateral", "length", "width", "thickness", "over", "below", "front", "back", "left", "right", "vertical", "horizontal", "top", "bottom", "in", "out", "clockwise", "counterclockwise", "axial", "radial", "circumferential", etc., are based on the orientation or position relationship shown in the drawings, and are only for the convenience of describing the present disclosure and simplifying the description, rather than indicating or implying that the pointed device or element must have a specific orientation, or be constructed and operated in a specific orientation, and therefore cannot be understood as limitation to the present disclosure. In addition, the features associated with "first" and "second" may explicitly or implicitly include at least one of the features. In the description of the present disclosure, "plurality" means at least two, unless otherwise specifically defined. In the embodiments of the present disclosure, a structure in which a first feature is "on" or "below" a second feature may include an embodiment in which the first feature is in direct contact with the second feature, and may also include an embodiment in which the first feature and the second feature are not in direct contact with each other, but are in contact via an additional feature formed therebetween.

In the description of the present disclosure, a first feature "on", "above", or "on top of" a second feature may include an embodiment in which the first feature is orthogonally or obliquely "on", "above", or "on top of" the second feature, or just means that the first feature is at a height higher than that of the second feature In the description of the present disclosure, it should be noted that, unless otherwise clearly specified and limited, terms such as "installation", "connection", "connected to", and the like should be understood in a broad sense. For example, it may be a fixed connection, a detachable connection, or an integral connection; it may be a mechanical connection or electrical connection, a direct connection or an indirect connection through an intermediate, an internal communication of two components. For those skilled in the art, the specific meaning of the above-mentioned terms in the present disclosure can be understood as desired.

In the description of the present disclosure, descriptions with reference to the terms "an embodiment", "some embodiments", "illustrative embodiments", "an example", "a specific example", "some examples", etc., mean that specific features, structure, materials, or characteristics described in conjunction with the embodiment or example are included in at least one embodiment or example of the present disclosure. In this specification, the schematic representations of the above terms do not necessarily refer to the same embodiment or example. Moreover, the described specific features, structures, materials, or characteristics may be combined in any one or more embodiments or examples in a suitable manner.

Although embodiments of the present disclosure have been illustrated and described above, it is conceivable for those skilled in the art that various changes, modifications, replacements, and variations can be made to these embodiments without departing from the principles and spirit of the present disclosure. The scope of the present disclosure shall be defined by the claims as appended and their equivalents.

What is claimed is:

1. A water intake structure of a spray arm assembly, the water intake structure comprising:
   a water dispensing member having a water intake passage and a water outlet in communication with the water intake passage;
   a water flowing pipe having a water flowing passage in communication with the water outlet, the water flowing pipe being rotatable relative to the water dispensing member;
   a housing having a mounting opening and an engagement recess, the water flowing pipe passing through the mounting opening to engage with the water dispensing member;
   a support engaged into the engagement recess, the water flowing pipe rotatably passing through an interior of the support; and
   a snap-fit member in snap-fit with the water flowing pipe, the snap-fit member being configured to limit positions of the water flowing pipe and the support.

2. The water intake structure of the spray arm assembly according to claim 1, wherein the snap-fit member is configured to limit the positions of the water flowing pipe and the support in an axial direction of the water flowing pipe.

3. The water intake structure of the spray arm assembly according to claim 1, wherein:
   a snap-fit groove is formed at an outer peripheral surface of the water flowing pipe;
   the snap-fit member is sleeved over an outer peripheral wall of the water flowing pipe; and
   the snap-fit member is provided with a snap-fit protrusion, the snap-fit protrusion being configured to be engaged into the snap-fit groove to restrict movement of the water flowing pipe away from the water dispensing member.

4. The water intake structure of the spray arm assembly according to claim 1, wherein the snap-fit member is in contact fit with an end surface of the support facing towards the water dispensing member to restrict disengagement of the support from the engagement recess.

5. The water intake structure of the spray arm assembly according to claim 1, wherein the water dispensing member has a first engagement surface, the water outlet being formed at the first engagement surface, and an end of the water flowing pipe in an axial direction of the water flowing pipe being in contact fit with the first engagement surface.

6. The water intake structure of the spray arm assembly according to claim 5, wherein:

the first engagement surface is provided with an engagement sleeve that extends towards the water flowing pipe; and a first seal is provided between the water flowing pipe and an inner peripheral wall of the engagement sleeve.

7. The water intake structure of the spray arm assembly according to claim 3, wherein:

the snap-fit member is an annular snapping plate, the annular snapping plate having an inner end formed as the snap-fit protrusion and an outer end configured to be in contact fit with the housing; and the engagement recess is opened towards the water dispensing member.

8. The water intake structure of the spray arm assembly according to claim 1, further comprising:

a fixing cover fixedly connected to the water dispensing member and the housing, respectively, the fixing cover having a position-limiting hole, and the water flowing pipe being disposed and extending within the position-limiting hole.

9. The water intake structure of the spray arm assembly according to claim 8, wherein a mounting cavity is defined by the fixing cover, the housing, and the water flowing pipe, the snap-fit member being disposed in the mounting cavity.

10. The water intake structure of the spray arm assembly according to claim 9, wherein:

the mounting cavity is provided with a second seal sandwiched between the water flowing pipe and the fixing cover; and the fixing cover has an accommodation groove, a third seal being disposed in the accommodation groove and sandwiched between the fixing cover and the water dispensing member.

11. The water intake structure of the spray arm assembly according to claim 3, wherein:

the snap-fit member is a pull ring, a limiting boss being disposed on the pull ring; and a position-limiting engagement boss is provided on the outer peripheral surface of the water flowing pipe and engaged with the position-limiting boss, the position-limiting boss and the engagement protrusion being spaced apart from each other in an axial direction of the pull ring.

12. The water intake structure of the spray arm assembly according to claim 1, wherein:

a rotation axis of the water flowing pipe extends in an axial direction of the water flowing pipe; and the water intake structure further comprises a drive member configured to drive the water flowing pipe to rotate.

13. The water intake structure of the spray arm assembly according to claim 12, wherein:

the drive member comprises a gear member;

the water flowing pipe penetrates a middle portion of the drive member, and the water flowing pipe and the drive member are integrally formed; and the water flowing pipe comprises a first pipe section located on a side of the drive member and engaged with the water dispensing member and a second pipe section located on another side of the drive member.

14. The water intake structure of the spray arm assembly according to claim 1, wherein the support comprises a ball bearing.

15. A spray arm assembly for a household appliance, the spray arm assembly comprising:

the water intake structure of the spray arm assembly according to claim 1; and a spray pipe fixedly connected to the water flowing pipe, the spray pipe having a water flowing cavity in communication with the water flowing passage, and a rotation axis of the spray pipe being parallel to an axis of the spray pipe.

16. The spray arm assembly according to claim 15, wherein the snap-fit member is configured to limit the positions of the water flowing pipe and the support in an axial direction of the water flowing pipe.

17. The spray arm assembly according to claim 15, wherein:

a snap-fit groove is formed at an outer peripheral surface of the water flowing pipe;

the snap-fit member is sleeved over an outer peripheral wall of the water flowing pipe; and the snap-fit member is provided with a snap-fit protrusion, the snap-fit protrusion being configured to be engaged into the snap-fit groove to restrict movement of the water flowing pipe away from the water dispensing member.

18. The spray arm assembly according to claim 15, wherein the snap-fit member is in contact fit with an end surface of the support facing towards the water dispensing member to restrict disengagement of the support from the engagement recess.

19. The spray arm assembly according to claim 15, wherein the water dispensing member has a first engagement surface, the water outlet being formed at the first engagement surface, and an end of the water flowing pipe in an axial direction of the water flowing pipe being in contact fit with the first engagement surface.

20. A dishwasher comprising the spray arm assembly for the household appliance according to claim 15.

* * * * *